United States Patent [19]
Abe et al.

[11] Patent Number: 5,978,546
[45] Date of Patent: Nov. 2, 1999

[54] DIGITAL/ANALOG COMPATIBLE VIDEO TAPE RECORDER

[75] Inventors: Hiroya Abe, Hiratsuka; Hideo Nishijima; Hiroyuki Torii, both of Hitachinaka; Kouji Kaniwa, Yokohama; Katsuyuki Watanabe, Mito; Toshio Nakamoto, Hitachinaka, all of Japan

[73] Assignee: Hitachi, Ltd., Tokyo, Japan

[21] Appl. No.: 08/584,134

[22] Filed: Jan. 11, 1996

[30] Foreign Application Priority Data

Jan. 17, 1995 [JP] Japan ................................. 7-004634
Mar. 15, 1995 [JP] Japan ................................. 7-055416

[51] Int. Cl.⁶ ........................... H04N 5/926; H04N 5/91; H04N 7/00
[52] U.S. Cl. ............................... 386/124; 396/96; 396/46
[58] Field of Search ........................ 386/124, 46, 52, 386/1, 94, 96, 39, 35, 40, 44; 360/32; H04N 5/926, 5/91, 7/00

[56] References Cited

U.S. PATENT DOCUMENTS

| | | | |
|---|---|---|---|
| 4,786,986 | 11/1988 | Yamanushi et al. | 360/33.1 |
| 5,075,803 | 12/1991 | Moro et al. | 360/27 |
| 5,394,249 | 2/1995 | Shimoda et al. | 348/46 |
| 5,493,455 | 2/1996 | Miyoshi et al. | 360/60 |
| 5,506,733 | 4/1996 | Kim et al. | 360/27 |
| 5,548,410 | 8/1996 | Kim et al. | 386/124 |
| 5,808,750 | 9/1998 | Yang et al. | |

FOREIGN PATENT DOCUMENTS

| | | |
|---|---|---|
| 60-209969 | 10/1985 | Japan. |
| 5-207507 | 8/1993 | Japan. |
| 6-84107 | 3/1994 | Japan. |
| 8-180501 | 7/1996 | Japan. |
| 63-298862 | 12/1998 | Japan. |
| 63-298863 | 12/1998 | Japan. |

OTHER PUBLICATIONS

Terebijon Gakkai–shi, vol. 47, No. 6, pp. 814–825 (1993).
Terebijon Gakkai–shi, vol. 47, No. 4, pp. 486–503 (1993).

*Primary Examiner*—Robert Chevalier
*Attorney, Agent, or Firm*—Antonelli, Terry, Stout & Kraus, LLp

[57] ABSTRACT

A VTR compatible with the current analog VTR and capable of recording and reproducing digital signals identifies the type of a tape cassette by the presence or absence of a cassette identification hole formed in a digital recording tape cassette determines tape speed for a recording mode on the basis of the ratio between the frequency of a control signal and the rotating speed of a capstan motor, determines the presence or absence of recorded digital signals through the synchronous detection of reproduced output, and decides the mode for recording and reproducing on the basis of those decisions. Thus, the automatic discrimination between the analog mode and the digital mode can be achieved and erroneous operations, such as an erroneous erasing operation can be prevented.

21 Claims, 18 Drawing Sheets

DIGITAL/ANALOG COMPATIBLE VIDEO TAPE RECORDER

BACKGROUND OF THE INVENTION AND RELATED ART

The present invention relates to a video tape recorder (VTR) for recording and reproducing video signals and, more specifically, to a digital/analog compatible VTR which is capable of dealing with both digital and analog video signals.

Current domestic VTRs are analog VTRs using ½ in. oxide tapes for recording analog TV signals.

Digital broadcasting systems have been developed as TV broadcasting systems of the next generation and efforts have been made for the development of practical transmission systems, for digital transmission using satellites, ground waves and cables. For example, there is in the U.S.A. an ATV (Advanced Television) system using a bandwidth of 6 MHz, which is used for current TV broadcasting, that processes wide-band video signals of high definition (hereinafter referred to as "High Definition (HD) video signals") higher than those of video signals of the current NTSC system and the PAL system (hereinafter referred to as "Standard Definition (SD) video signals) into compressed and coded digital video signals. The MPEG (Moving Picture Experts Group) system is a known SD video signal system. Refer to Terebijon Gakkai-shi, Vol. 47, No. 4, pp. 486–503 (1993) for the further details concerning digital broadcasting systems.

It is expected that those digital broadcasting systems will be employed together with analog TV broadcasting systems in the near future. Accordingly, for practical use of digital broadcasting or digital transmission, a practical development is expected to be made of VTRs of the digital recording system type which are capable of recording digital signals utilizing the feature of digital transmission in which signals are not deteriorated by transmission systems. However, digital VTRs have been used practically only in special fields, such as in the business field because of the information content digital video signals is greater than that of analog video signals. Recent advancement in image-compressing techniques represented by the MPEG system has made possible the miniaturization of digital equipments and the extended use of digital techniques for domestic equipments. Refer to Terebijon Gakkai-shi, Vol. 47, No. 6, pp. 814–825 (1993) for further details concerning digital recording techniques. Domestic digital VTRs having an original recording format have been developed. However, most users keep analog-recorded tapes collected as property, and there are problems in digital VTRs in price, floor space necessary for installation and the use of the collected analog-recorded tapes.

Accordingly, VTRs capable of recording and reproducing signals in both the analog system and the digital system have been desired. However, it is expected that the following problems reside in VTRs capable of dealing with both analog and digital systems. Firstly, since analog recording and digital recording use different input sources, respectively, the user needs to select the recording system and the input source and to confirm the coincidence of the selected recording system and input source, which requires troublesome operations for recording and increases the possibility of erroneous operations. Secondly, there are problems in using tape cassettes of the same shape, including those containing tapes on which signals are recorded by the analog system and those on which signals are recorded by the digital system. For example, when recording signals on a tape carrying recorded signals by the current analog VTR in a continuous mode or an overwrite mode, the contents of the tape must be reproduced tentatively for confirmation. However, when tapes of both the analog system and the digital system are used together, the user is unable to recognize pictures recorded by either system unless the reproducing system coincides with the selected recording system and the input source; consequently, there is the possibility that the user misunderstands that no signal is recorded on the tape and overwrites new signals on the tape, thereby erasing the previously-recorded signal mistakenly. In addition, when an increasing number of recorded tapes of the digital system are used, there is a problem that the user is unable to recognize signals recorded on the tape of the digital system with the current analog VTRs, resulting in erasing of the previously-recorded signal mistakenly.

Most current analog VTRs are provided with an audio head independently of a video head on a rotary drum to record FM signals in the depth of a magnetic tape. Therefore, it is disadvantageous from the point of view of cost and productivity to provide on a rotary drum a magnetic head specially for digital recording and reproducing and a proposal is made for the use of an audio head also for digital recording. However, when an FM audio head is used also as a digital head, an audio signal processing circuit is actuated, which processes digital signals for audio processing when reproducing the digital signals and supplies the audio-processed digital signals to a loudspeaker. Then, the loudspeaker generates abnormal sounds and, in the worst case, the loudspeaker might be destroyed. Although the conventional VTR has an automatic tracking control function to provide reproduced outputs on the highest level, the VTR needs a new automatic tracking control function for operation in a digital recording mode. When the VTR is provided with a decoding circuit for expanding compressed and coded digital video signals and converting the expanded digital video signals into composite video signals, the circuits need to be changed according to mode identifying information.

OBJECT OF THE INVENTION

Accordingly, it is a first object of the present invention to provide a digital/analog compatible VTR which is capable of recording and reproducing both analog signals and digital signals, having an automatic digital/analog mode identifying function, and which is capable of being easily operated for recording and reproducing operations and of preventing erroneous operations, such as an erroneous erasing operation.

A second object of the present invention is to provide the aforesaid digital/analog compatible VTR with an optimum automatic tracking control function.

SUMMARY OF THE INVENTION

With the foregoing objects in view, the present invention provides a digital/analog compatible VTR that identifies the type of tape cassette by an identification hole formed in the tape cassette, determines tape speed for recording from the ratio between the frequency of a control signal and the rotational velocity of a capstan motor for feeding tapes, determines whether or not there is a digital recording signal through the synchronous detection of reproduced signals, and selects either a recording mode or a reproducing mode according to these determinations. For example, when carrying out a recording operation, the type of the tape cassette is identified, and the digital/analog compatible VTR automatically selects a recording circuit and an input source to give priority to digital recording when a digital recording cassette is loaded into the VTR. Therefore, the user need not perform any operation for setting input signals, and only digital signals are recorded on tapes for digital recording to facilitate tape management. When a reproducing instruction is given, the digital/analog compatible VTR selects a reproducing mode for the most probable recording system according to the result of detection of the type of tape cassette, for example, the digital reproducing mode when a tape cassette containing a tape on which digital video signals are recorded is loaded into the digital/analog compatible VTR, to curtail the time necessary for starting the reproducing operation after the reproducing instruction has been given thereto.

The digital/analog compatible VTR of the present invention carries out a reproducing operation prior to a recording operation, and identifies the type of loaded tape cassette by the existence or absence of the digital tape cassette identification hole, or detects a signal indicating the digital system through the determination of tape speed for recording on the basis of the ratio between the frequency of a control signal and the rotating velocity of a capstan motor. Consequently, erroneous erasing by overwriting can be prevented by inhibiting the recording operation when it is determined that digital signals are recorded on the tape.

Furthermore, the digital/analog compatible VTR achieves automatic mode identification through the detection of the frequency of reproduced signals provided by an FM-audio/digital recording head for both FM audio signal recording and digital signal recording, automatically switches between the respective output signals of an output level detecting circuit for detecting the level of the output signals of an analog video signal recording head and the FM-audio/digital recording head, and executes an automatic tracking control operation so that the output signals are on the highest level in each mode. When processing digital signals, the identifying performance can be further enhanced through the identification of a phase-locked state by a phase-locked loop (PLL). A high-performance tracking state can be secured in both an analog mode and a digital mode by switching the path of the automatic tracking control to an analog signal processing side or a digital signal processing side according to the result of mode identification.

BRIEF DESCRIPTION OF THE DRAWINGS

The present invention will become more apparent from the following detailed description, when taken in conjunction with the accompanying drawings, in which.

DESCRIPTION OF THE PREFERRED EMBODIMENTS

Figure 1:
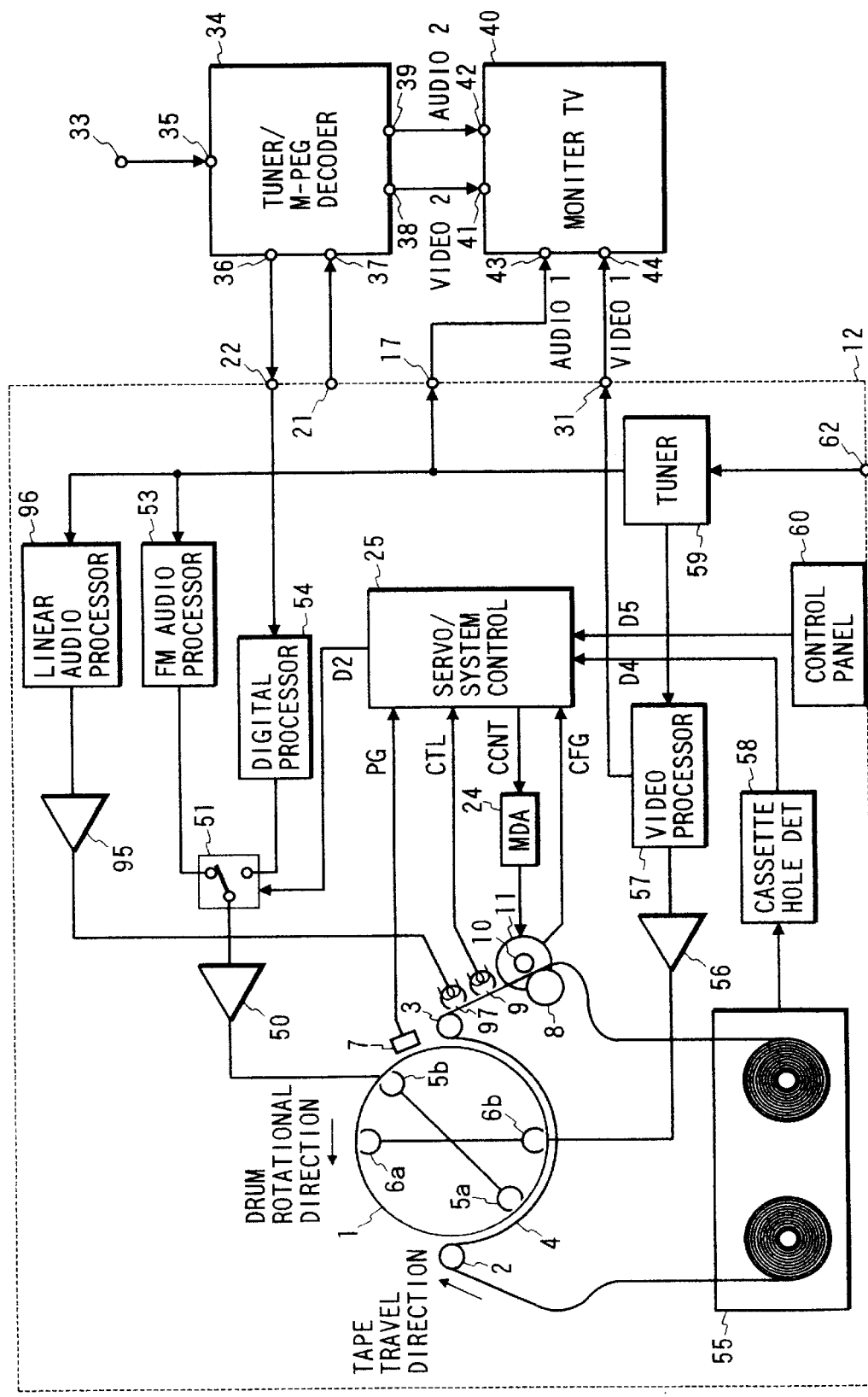
FIG. 1 is a block diagram of a recording system included in a VTR in a first embodiment according to the present invention.

A VTR system in a first embodiment according to the present invention will be described with reference to FIG. 1 showing a recording system included in the VTR system. The VTR system is constructed by incorporating a digital signal recording system into a conventional VHS VTR (Video Home System Video Tape Recorder), as a base apparatus. The VHS has three tape speed modes, namely, an SP mode (Standard Play mode), an LP mode (Long Play mode) and an EP mode (Extended Play mode). Since the recording signal bandwidth for digital recording is wider than that for analog recording, the reduction of track width makes it difficult to secure a high S/N ratio for reproduced signals and design conditions for the analog system are employed. Therefore, this VTR system operates in the LP mode for digital recording. Referring to FIG. 1, there are shown a rotary drum 1, guide posts 2 and 3, a magnetic tape 4, magnetic heads 5a, 5b, 6a and 6b, a drum phase generator (DPG) 7, a pinch roller 8, a CTL head 9, a capstan shaft 10, a capstan motor 11, a linear audio head 97, a tape cassette 55, recording amplifiers 50, 56 and 95, linear audio signal processor 96, a switching circuit 51, an FM audio signal processor 53, a digital signal processor 54, a servo system controller 25, a motor driver 24, an analog video signal processor 57, a tuner unit 59, a cassette identification hole detector 58, input terminals 22, 61 and 62, output terminals 21, 17 and 31, a VTR 12, a tuner/MPEG decoder 34, a monitor TV 40, a bit-compressed digital signal input terminal 33, input terminals 35 to 39 and 41 to 44, and an operation control panel 60 provided with a record button, a playback button, an analog/digital selector switch and such.

The digital recording operation of the VTR system will be described hereinafter. A bit-compressed and modulated digital signal applied to the input terminal 33 is demodulated by the tuner/MPEG decoder 34, and the bit-compressed digital signal is transferred through the terminal 36 to the input terminal 22 of the VTR 12. A digital signal reproduced by the VTR 12 is transferred through the terminal 21 to the input terminal 37 of the tuner/MPEG decoder 34 and is decoded to obtain a composite video signal. A video signal and an audio signal are sent through the terminals 38 and 39 to the terminals 41 and 42 of the monitor TV 40, respectively. An audio signal and a video signal are sent through the terminals 17 and 31 of the VTR 12 to the terminals 43 and 44 of the monitor TV 40, respectively.

In an analog VTR mode, an audio signal provided by the tuner 59 of the VTR 12 is transferred through the linear audio signal processor 96 and the recording amplifier 95 to the audio head 97, and the audio head 97 in turn writes the audio signal on the linear tracks of the magnetic tape 4. The audio signal is transferred also through the FM audio signal processor 53, the switching circuit 51 and the recording amplifier 50 to the magnetic heads 5a and 5b, and the magnetic heads 5a and 5b record the audio signal in the depth of the magnetic tape 4. The magnetic heads 5a and 5b for dealing with FM audio signals are disposed at azimuth angles of ±30°, which are greatly different from azimuth angles ±6° at which the magnetic heads 6a and 6b for dealing with video signals are disposed, to suppress interference therebetween. A luminance signal FM-modulated by the video signal processor 57 and a down-converted chrominance signal are combined by frequency-multiplexing and the composite video signal is amplified by the recording amplifier 56 and the amplified composite video signal is given to the magnetic heads 6a and 6b to be written on the surface of the magnetic tape 4.

In a digital VTR mode, a digital signal applied to the terminal 22 is sent through the digital signal processor 54, the switching circuit 51 and the recording amplifier 50 to the magnetic heads 5a and 5b, and is recorded on the magnetic tape 4. The azimuth angles ±30° of the magnetic heads 5a and 5b, which deal with FM audio signals, are large enough to secure the a satisfactory performance of the magnetic heads 5a and 5b. The VTR 12 executes the same processes when a digital signal that is not bit-compressed is applied to the input terminal 22 instead of the bit-compressed digital signal. Although the azimuth angles of the magnetic heads for digital recording need to be large to suppress interference between the adjacent tracks because the bandwidth of digital signals is wider than that of analog signals, the azimuth angles of ±30° of the VHS FM audio heads is large enough to secure satisfactory performance for digital recording and the smaller number of magnetic heads is more advantageous in cost and productivity. Therefore, the digital recording heads are used also as the heads for analog audio signals, Naturally, the VTR 12 may be provided with recording heads specially for digital audio signals.

The discrimination between the analog recording mode and the digital recording mode will be described hereinafter. The tape cassette 55 contains a high-performance magnetic tape which is capable of digital recording. The VHS VTR is capable of dealing with S-VHS and of dealing with both VHS magnetic tapes and S-VHS magnetic tapes having a coercive force Hc higher than that of VHS tapes. Since digital recording needs magnetic tapes having a high coercive force, magnetic tapes having a coercive force substantially equal to that of S-VHS magnetic tapes must be used for digital recording. Therefore, this VTR system uses VHS tape cassettes (hereinafter referred to as "V-cassettes"), S-VHS tape cassettes (hereinafter referred to as "S-cassettes") and tape cassettes for digital recording (hereinafter referred to as "D-cassettes"). V-cassettes are used only for VHS recording, and the S-cassettes and the D-cassettes are used for VHS recording, S-VHS recording and digital recording. V-cassettes, S-cassettes and D-cassettes are provided with a V-cassette identification hole, an S-cassette identification hole and a D-cassette identification hole, respectively.

Figure 2:
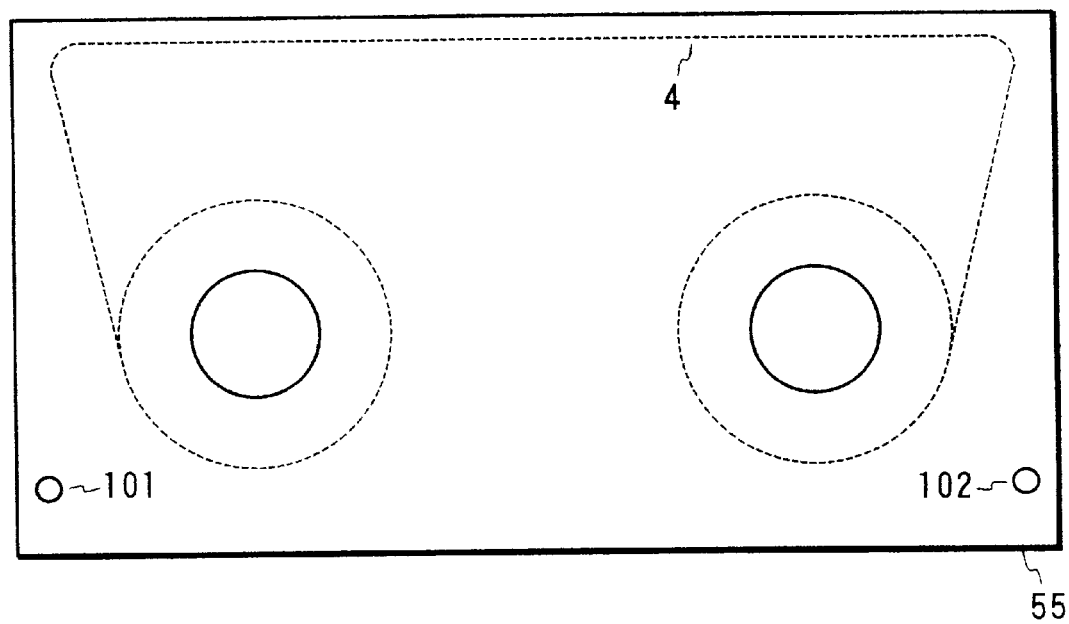
FIG. 2 is a typical plan view of a tape cassette to be used by the VTR of the present invention.
Figure 3:
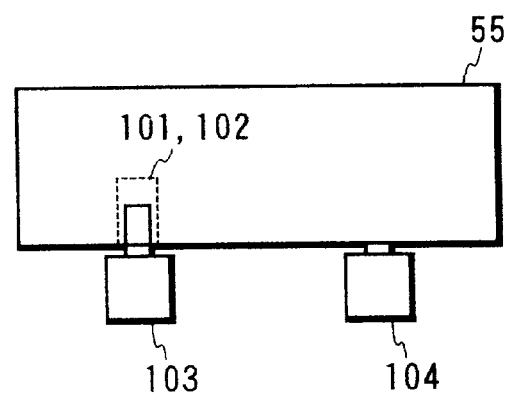
FIG. 3 is a typical view for explaining the principle of cassette identification.

Referring to FIG. 2, the tape cassette 55 is provided with an S-cassette identification hole 101 and a D-cassette identification hole 102. The tape cassette 55 is positioned with the cassette identification holes 101 and 102 corresponding to push switches 103 and 104, respectively, when the tape cassette 55 is loaded into the VTR 12, as shown in FIG. 3. When the tape cassette 55 is provided with only the S-cassette identification hole 101, only the push switch 104 is operated and the push switch 103 is not operated, as shown in FIG. 3. Thus, whether or not the tape cassette 55 is provided with an identification hole is detected from the output signals of the push switches 103 and 104.

Figure 4:
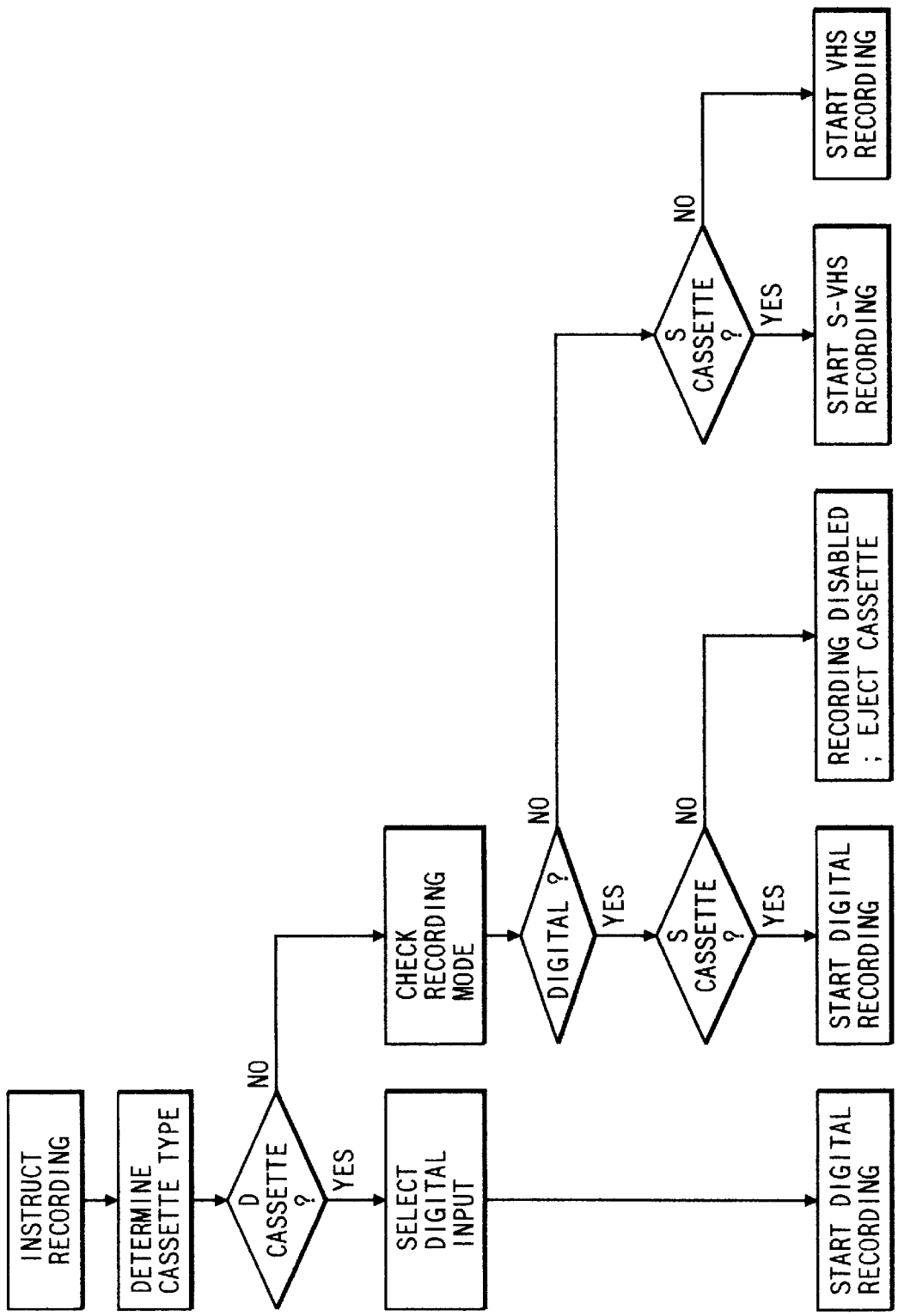
FIG. 4 is a flowchart of a recording operation control program.

FIG. 4 is a flowchart of a recording operation control program to be executed by the VTR 12. When an automatic cassette identification mode is selected, the type of the tape cassette is identified when the recording button of the operation control panel 60 is operated to provide a recording instruction. When a D-cassette is loaded into the VTR 12 and is identified, it is decided that digital recording is selected, the switch 51 selects a digital signal input mode, and the digital signal processor 54 is actuated to start the digital recording operation. The tape is fed at the tape speed for the LP mode. When a tape cassette other than a D-cassette is loaded into the VTR 12, the position of the manual mode changeover switch of the operation control panel 60 is examined. If the digital recording mode is selected and the tape cassette is identified to be an S-cassette, the digital recording operation is started. If the tape cassette is identified to be a V-cassette, the recording operation is inhibited and the tape cassette is ejected to give a warning to the user indicating that effect. The warning may be a sound generated by a buzzer or the like or an indication on the operation control panel 60 or the screen of the monitor TV 40. When a D-cassette is loaded into the VTR 12, the VTR system selects the digital recording mode automatically and the examination of the manual mode changeover switch is unnecessary, which facilitates the operation. When the automatic mode is selected, only the digital recording operation is executed for D-cassettes to prevent the user from mistaking digital recording for analog recording and vice versa. When an automatic timer recording function, which starts the recording operation at a set start time, which is used by current VTRs, is engaged, the tape cassette is identified after conditions for the automatic timer recording operation have been set, and a warning is given if the tape cassette is incompatible with the set conditions.

Figure 5:
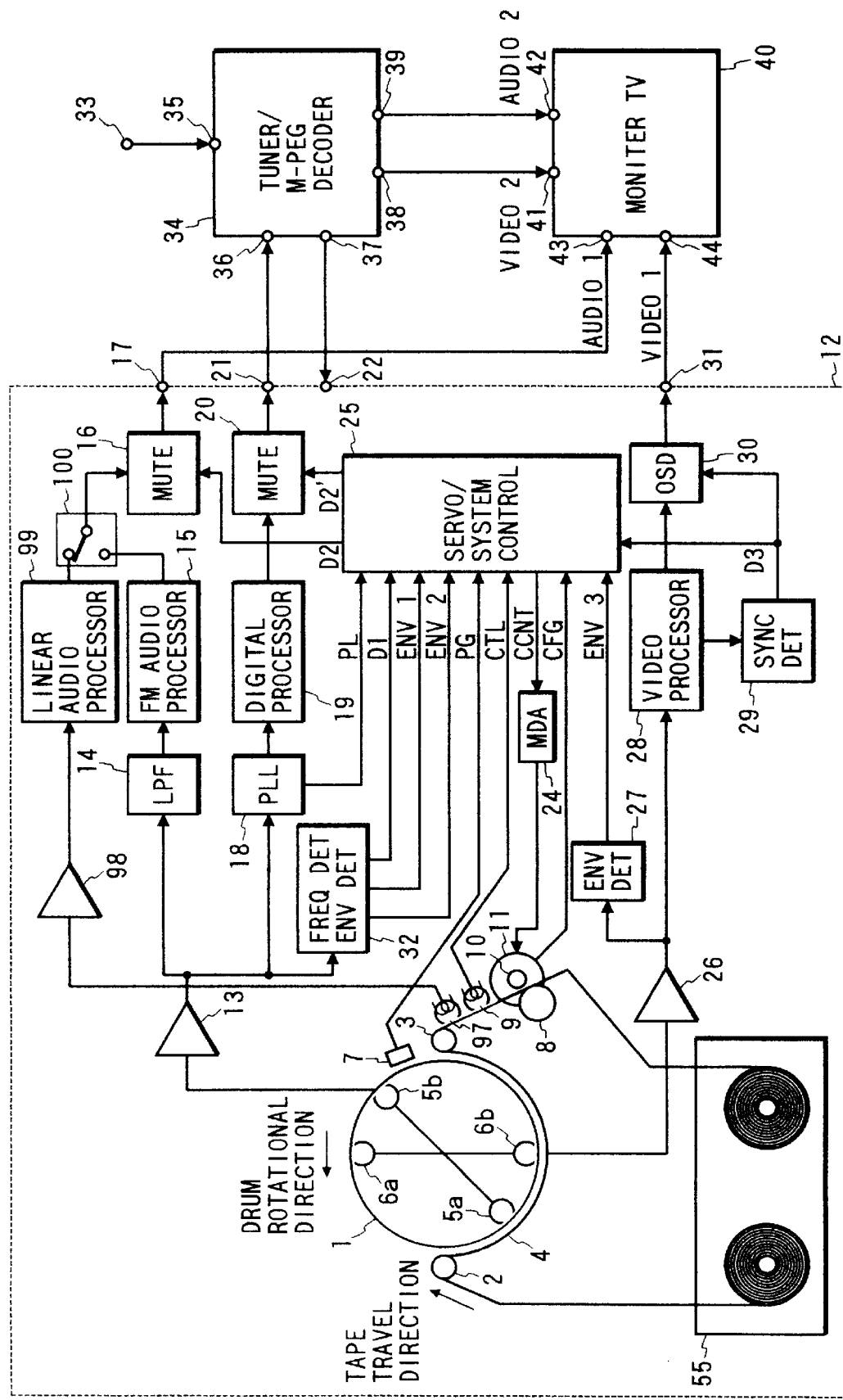
FIG. 5 is a block diagram of a reproducing system included in the VTR embodying the present invention.

Referring to FIG. 5, showing a reproducing system included in the VTR system in accordance with the present invention, there are shown reproducing amplifiers 98, 13 and 26, a linear audio signal processor 99, a switching circuit 100, an LPF 14, an FM audio signal processor 15, mute circuits 16 and 20, a PLL 18, a digital signal processor 19, a frequency/envelope detector 32, an envelope detector 27, a reproduced analog video signal processor 28, a synchronizing signal detector 29, and an OSD (On-Screen Display) 30 for character insertion and blue back screen replacement.

In FIG. 5, other components corresponding to those shown in FIG. 1 are designated by the same reference characters.

The mode identification control operation of the VTR system will be described hereinafter. The following three means are used for mode identification. A first means identifies the type of a loaded tape cassette by the identification hole. A second means identifies tape speed during recording. The VTR system, using the CTL head 9, reproduces a CTL signal recorded in the lower edge portion of a tape and identifies the mode on the basis of the frequency ratio or the period ratio between the reproduced CTL signal and an FG signal provided by the capstan motor 11. A microcomputer included in the servo system controller 25 executes an arithmetic operation to carry out a mode identifying process. The mode identifying process is carried out by the digital circuit shown in FIG. 6. A counter 71 is locked by the FG signal and is reset by the CTL signal. A latch circuit 73 latches the output upon the reception of the CTL signal. A delay circuit 72 resets the counter 71 after latching. Comparators 74 to 76 compare a latched count with predetermined values. An encoder 77 generates an identification signal on the basis of the outputs of the comparators 74 to 76.

Figure 6:
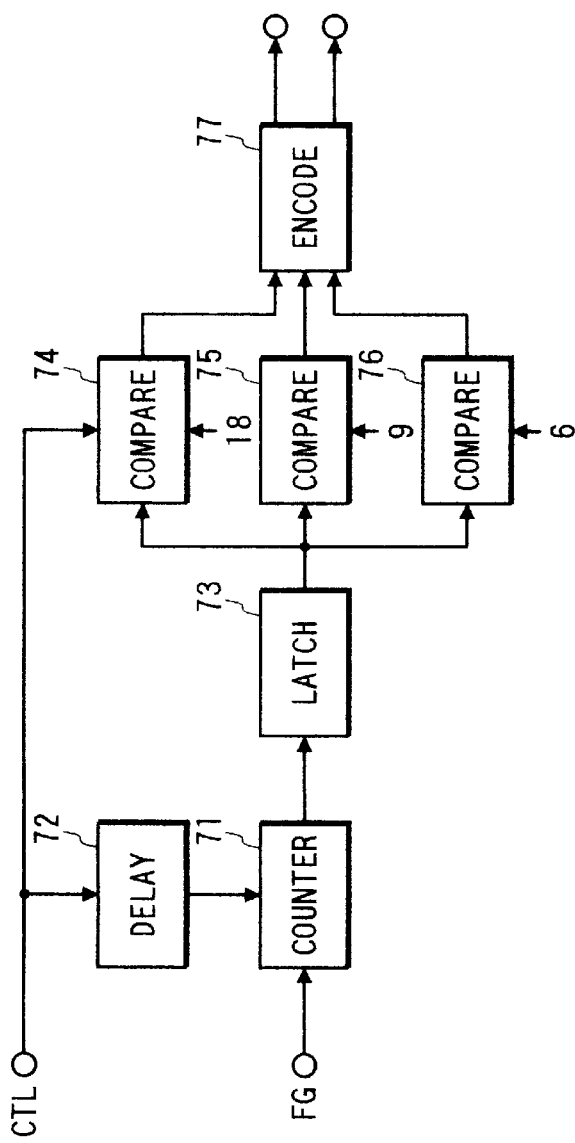
FIG. 6 is a block diagram of a tape speed detecting unit.
Figure 7:
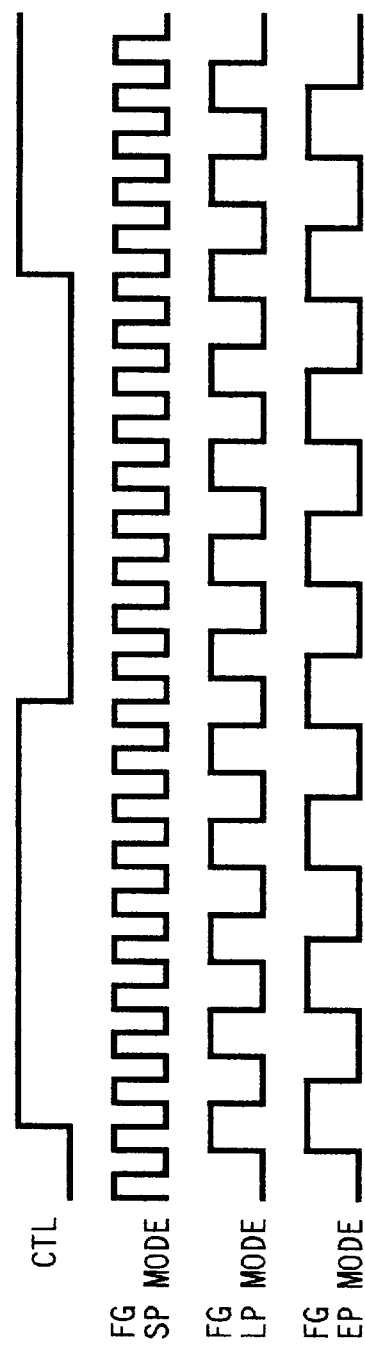
FIG. 7 is a waveform chart for explaining a tape speed detecting operation.

FIG. 7 is a waveform chart for assisting in explaining the operation of the digital circuit of FIG. 6. The frequency of the FG signal is proportional to the rotating speed of the capstan motor, and the feed of the magnetic tape is proportional to the FG signal. Although the CTL signal is recorded in each period of the frames, i.e., the period of one turn of a cylinder 1, the frequency ratio or the period ratio between the FG signal and the CTL signal is constant regardless of the tape speed. Since the tape speed is lower for a longer play mode, the frequency ratio is smaller for a longer play mode. For example, when the FG/CTL ratio is eighteen for the SP mode, the ruler is nine for the LP mode and six for the EP mode. The tape speed during the recording operation is identified by comparing the aforesaid values using the comparators 74 to 76 with the count of the counter 71, which is reset by the CTL signal.

A third means identifies the type of reproduced signals. In the VTR 12 shown in FIG. 5, a synchronous detection system employing PLL that detects the clock signal component of reproduced signals is used for digital signal identification. Digital signals may be identified through the detection of a signal which is determined to be a significant digital signal for digital signal processing, such as a synchronizing signal.

Figure 8:
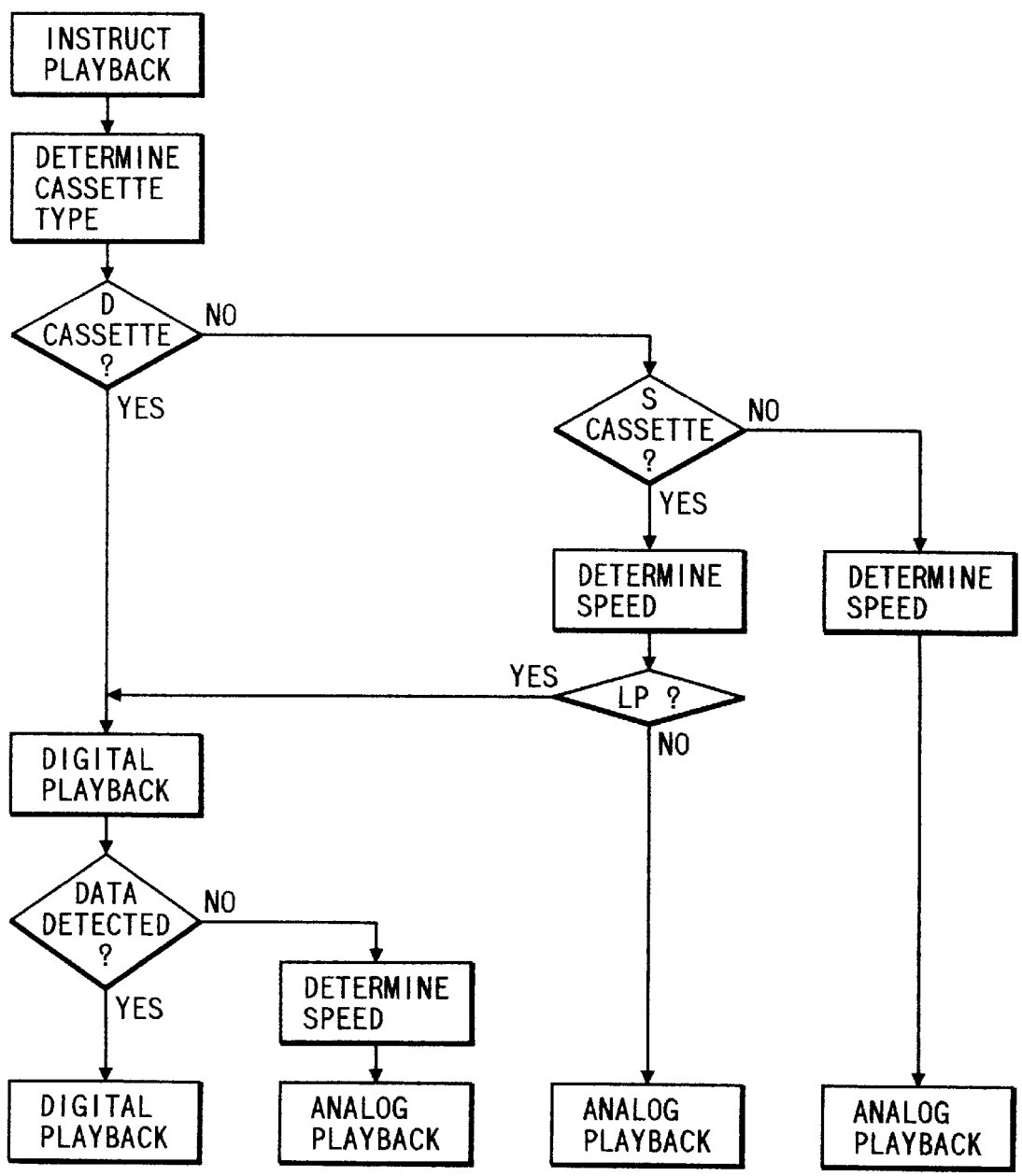
FIG. 8 is a flowchart of a reproducing operation control program in accordance with the present invention.

FIG. 8 is a flowchart of the mode identification operation to be executed by the VTR system. When a reproducing instruction is given by pushing the playback button of the operation control panel 60, the type of loaded tape cassette is identified. When the loaded tape cassette is identified to be a D-cassette, the digital reproducing mode is set because it is highly probable that digital signals are recorded on the tape of the tape cassette, and the reproducing speed for the LP mode is selected. Upon the completion of tracking control after the start of the reproducing operation, the aforesaid digital signal detecting operation is executed. When it is confirmed from the clock signal or the synchronizing signal that the tape carries digital-recorded signals, the digital reproducing operation is continued. When no digital signal is detected, it is highly probable that the tape carries analog-recorded signals. Therefore, the speed identifying process is executed to select a tape speed for the SP, the LP or the EP mode according to the results of detection, and an analog reproducing operation is executed. When the loaded tape cassette is identified to be an S-cassette, the tape speed for the SP mode is selected, the reproducing operation is started, and then the speed is identified. When the LP mode is selected, it is probable that the tape carries digital-recorded signals, and so the digital reproducing operation is executed and the aforesaid processes are executed. When the speed is identified to be that for the SP or the EP mode, the tape carries analog-recorded signals and hence the analog reproducing operation is executed. When the loaded tape cassette is identified to be a V-cassette, the analog reproducing operation is started immediately. Since a most probable reproducing mode and a corresponding tape speed are selected on the basis of the result of cassette identification hole detection, the reproducing operation for displaying pictures can be started in a short time after the reproducing instruction has been given.

Figure 9:
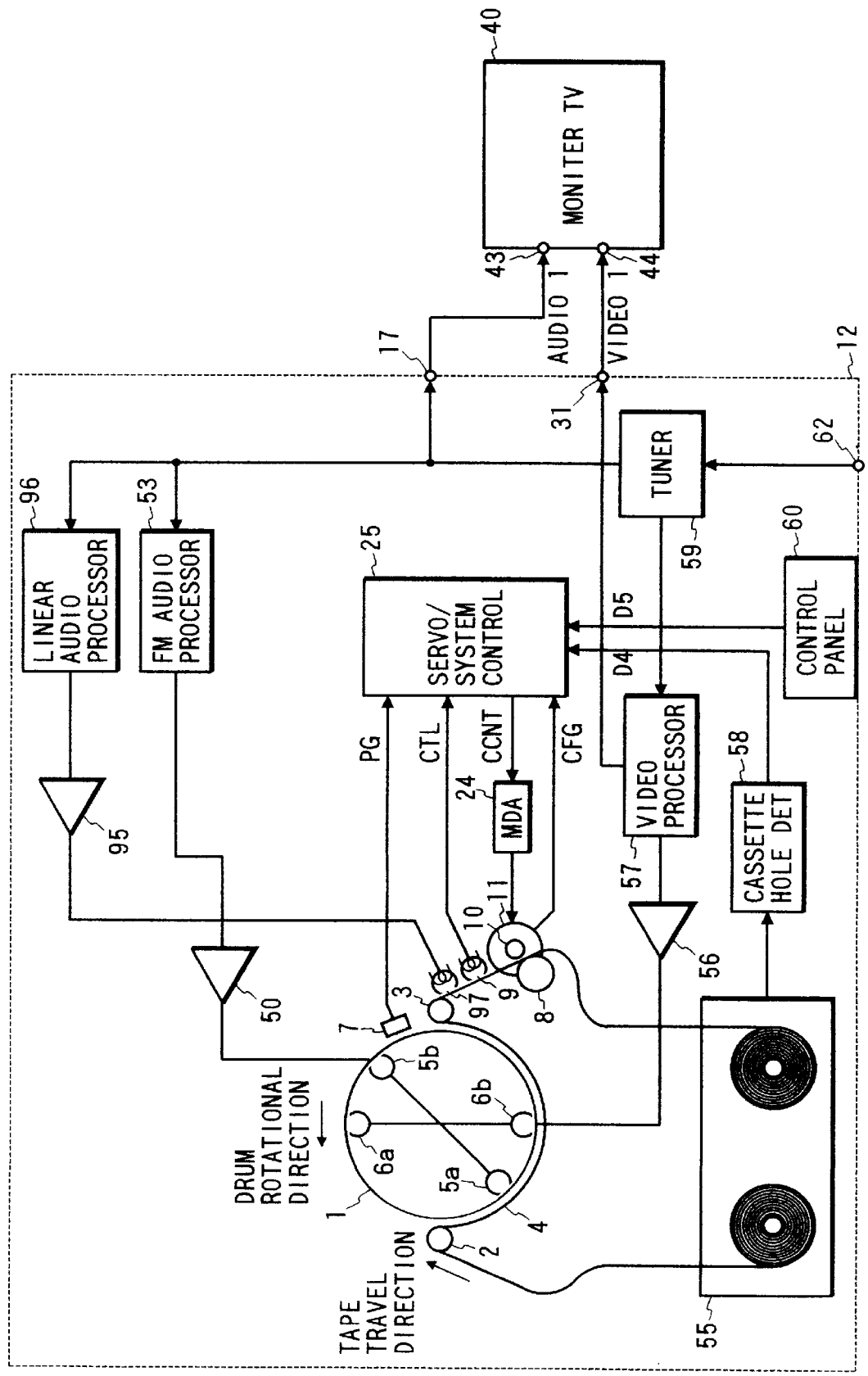
FIG. 9 is a block diagram of a VTR in a second embodiment according to the present invention.

A VTR system in a second embodiment according to the present invention will be described with reference to FIGS. 9 to 12. FIG. 9 is a block diagram of the recording system of a VHS VTR system having a configuration formed by excluding the components for digital recording operation from the VTR system of FIG. 1, and therefore is incapable of digital recording/reproducing operations. This VTR system is provided with a cassette identification hole detector 58 for a cassette identifying operation as previously described with reference to FIGS. 2 and 3, and is able to detect a tape carrying digital-recorded signals.

Figure 10:
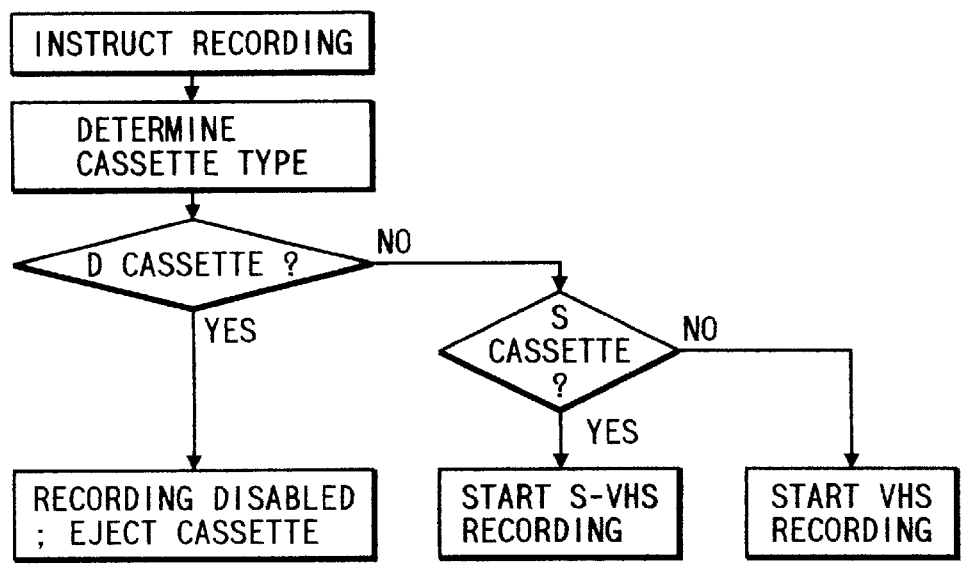
FIG. 10 is a flowchart of a recording operation control program in accordance with the present invention.

FIG. 10 is a flowchart of a recording operation to be carried out by the VTR system of FIG 9. Usually, the contents of a tape carrying recorded signals are reproduced tentatively for confirmation before recording new signals on the tape, when recording new signals on a tape already carrying recorded signals in a continuous mode or during an overwrite mode. However, an analog VTR is unable to recognize pictures even if digital signals are recorded on the tape; consequently, there is the possibility that the user misunderstands that no signal is recorded on the tape and overwrites new signals on the tape, so as to erase the previously-recorded signal mistakenly. Therefore, when a recording instruction is given, the type of the tape cassette is identified andr when the same is identified to be a D-cassette, a recording operation is inhibited and the loaded tape cassette is ejected. When the loaded cassette is not a D-cassette, a recording operation is permitted. Thus, the mistaken erasure of the previously-recorded signals by overwriting analog signals on the tape having a high probability of carrying digital signals of a D-cassette can be prevented. However, analog recording on the tape of a D-cassette need not necessarily be completely inhibited; in this regard, analog recording on the tape of a D-cassette may be permitted by manually cancelling the automatic identifying processes by the user.

Figure 11:
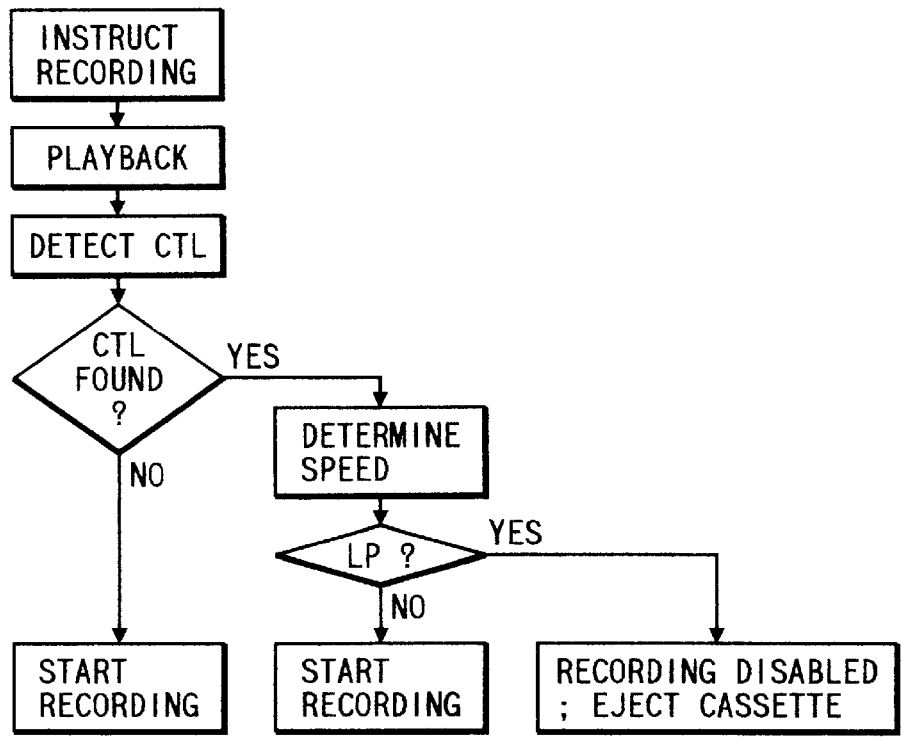
FIG. 11 is a flowchart of a recording operation control program in accordance with the present invention.

FIG. 11 is a flowchart of a control program to be executed to control the operation of a VTR system formed by removing the cassette identification hole detector 58 of FIG. 6 to reduce the number of the component parts and the cost of the VTR system provided with the circuit shown in FIG. 6. The operation of this VTR system will be described with reference to FIG. 11. Upon the reception of a recording instruction the VTR system executes a reproducing operation prior to a recording operation. If the CTL signal is not detected it is decided that no signal is recorded on the tape cassette, the reproducing operation is ended, and then the recording operation is started. If the CTL signal is detected, it is decided that the tape of the tape cassette carries recorded signals, and then a tape speed mode is identified. If the tape speed is of the SP mode or the EP mode, the recorded signals are those recorded by analog recording and the operation is overwriting. Therefore, the recording operation is permitted. When the tape speed is of the LP mode, it is highly probable that the recorded signals are those recorded by digital recording and a recording operation is inhibited and the tape cassette is ejected because the user is unable to know that signals are recorded on the tape because the VTR system is an analog VTR system and the possibility of mistaken overwriting is high.

Figure 12:
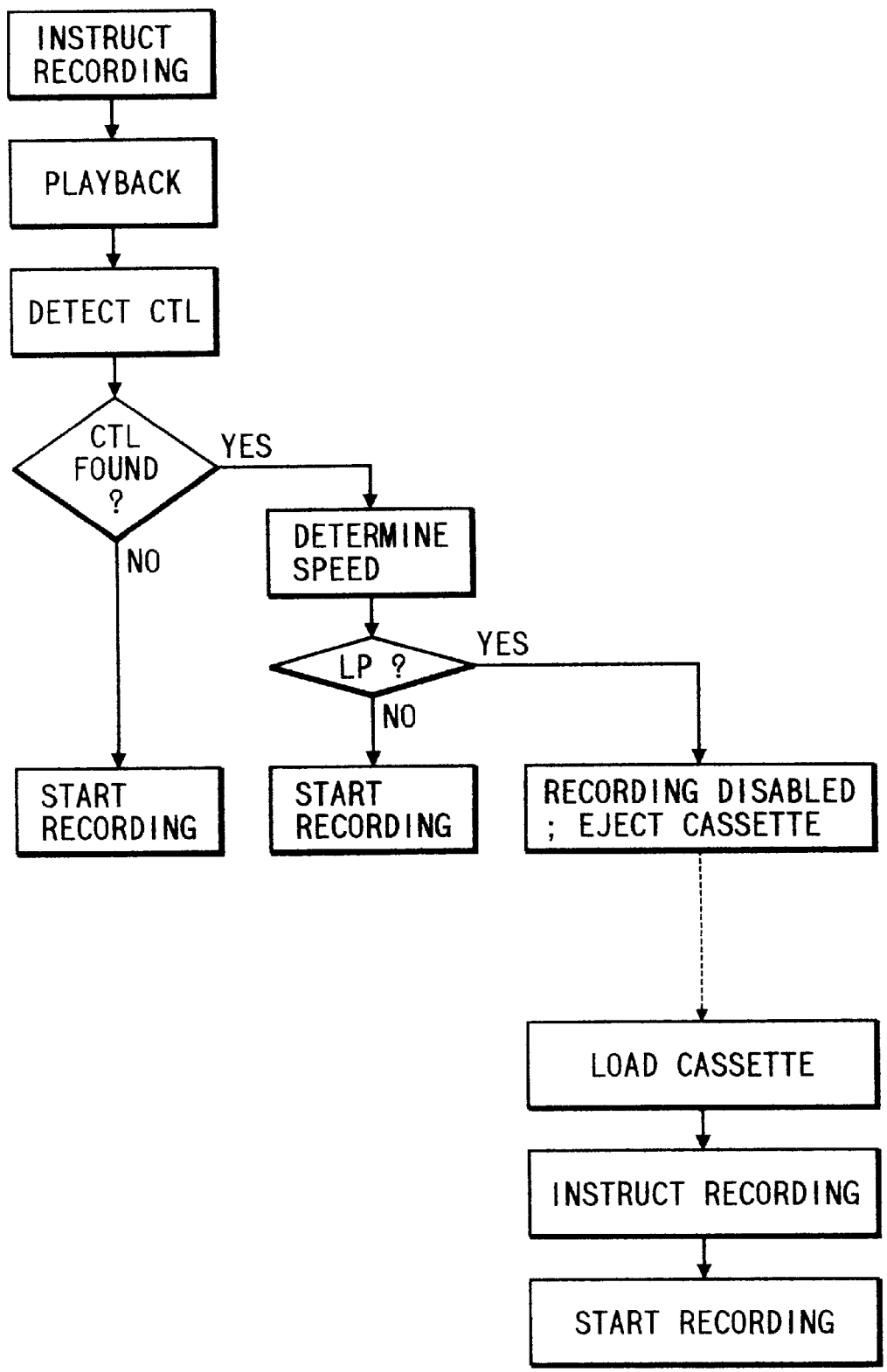
FIG. 12 is a flowchart of a recording operation control program in accordance with the present invention.

A control program shown in FIG. 12 permits a recording operation when the tape cassette is loaded again into the VTR after a recording operation has been inhibited and the tape cassette has been ejected. Therefore, when it is desired to record signals in the analog recording mode on the D-cassette or when overwriting signals intentionally knowing that digital signals may be recorded on the tape of the D-cassette, the signals can be recorded in the analog recording mode without disabling the function of the automatic cassette identification mode. This control program may be combined with the recording operation control program shown in FIG. 10.

Figure 13:
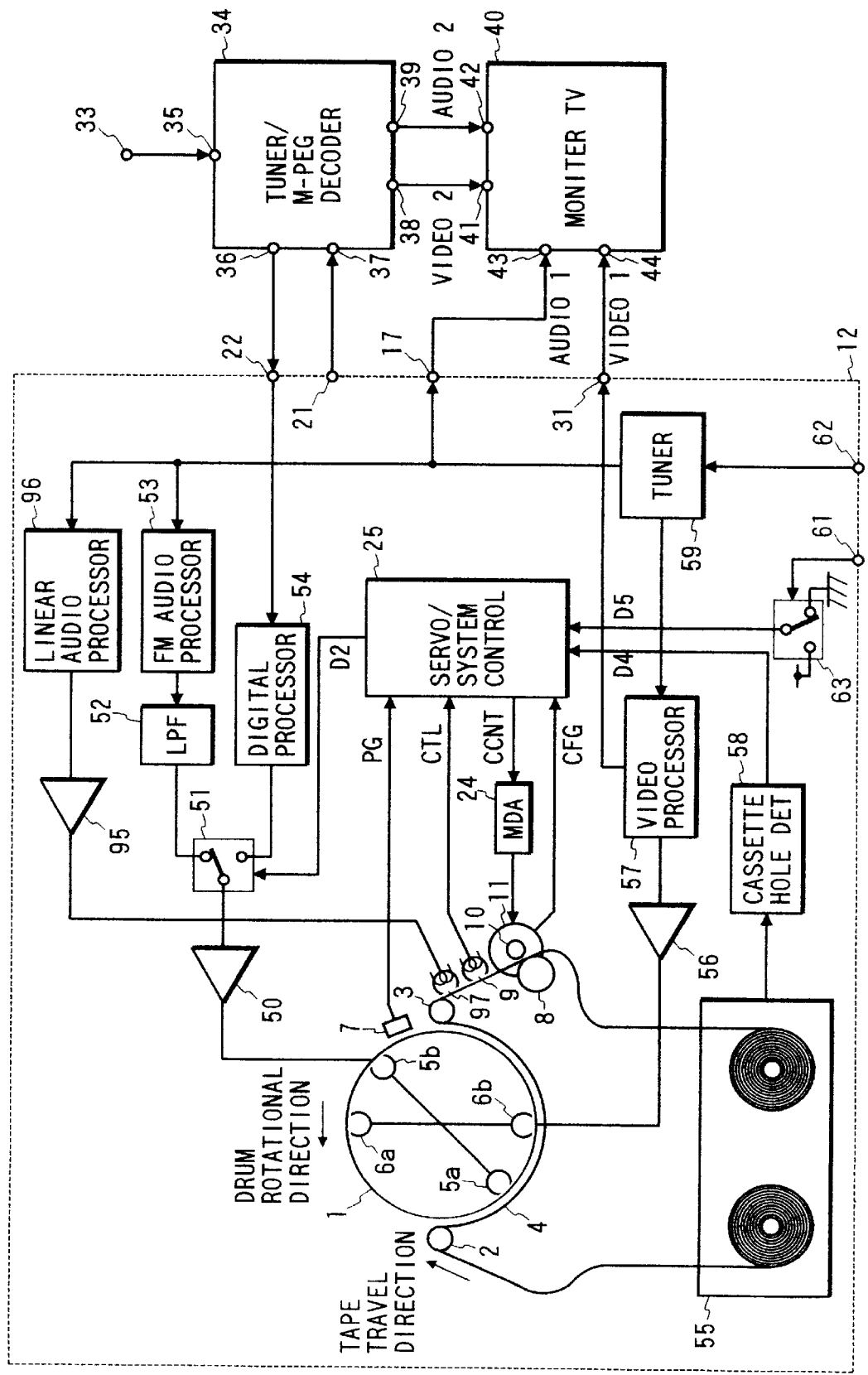
FIG. 13 is a block diagram of a recording system included in a VTR in accordance with the present invention.

FIG. 13 is a block diagram of a recording system included in a VTR system in a further embodiment according to the present invention. This VTR is substantially the same in configuration as the VTR of FIG. 1, except that a cassette identification hole detector 58 included in this VTR, similarly to the cassette identification hole detector of the conventional S-VHS VTR, detects only a VHS/S-VHS identification hole, and that this VTR enables the user to select either an analog recording mode or a digital recording mode by the function of a switch that is operated by a button provided on the case of a tape cassette.

Figure 20:
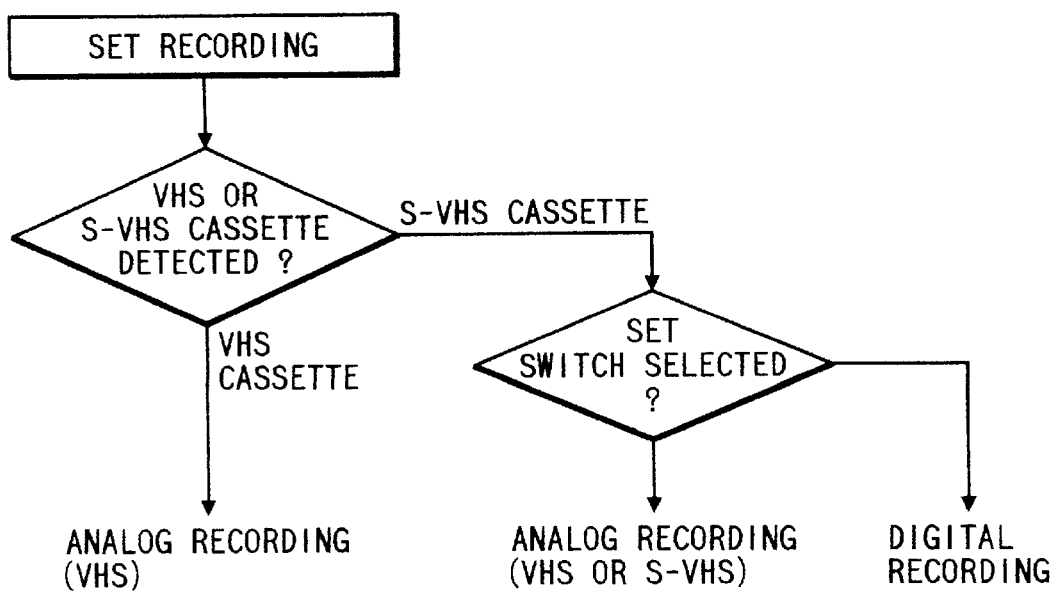
FIG. 20 is a flowchart of an analog/digital identifying program for a recording mode.

FIG. 20 is a flowchart of an analog/digital recording mode identifying program to be executed by this VTR. An S-cassette is provided with an S-cassette identification hole, which is detected mechanically and the cassette identification hole detector 58 identifies the S-cassette. The cassette identification hole detector 58 gives a detection signal D4 to a servo system controller 25. If the detection signal D4 indicates a V-cassette, the analog recording mode is selected. When an S-cassette is used, the user selects either the analog recording mode or the digital recording mode using the button provided on the S-cassette. The switching circuit 63 is controlled by a setting signal applied by the user to the input terminal 61 to give an H/L signal D5 to the servo system controller 25. Then, the servo system controller 25 gives a control signal D2 to the switching circuit 51 to select either the analog recording mode or the digital recording mode. Tape speed is determined by controlling the motor driver 24 using a control signal CCNT to control the operating speed and the phase of the capstan motor 11.

Figure 18:
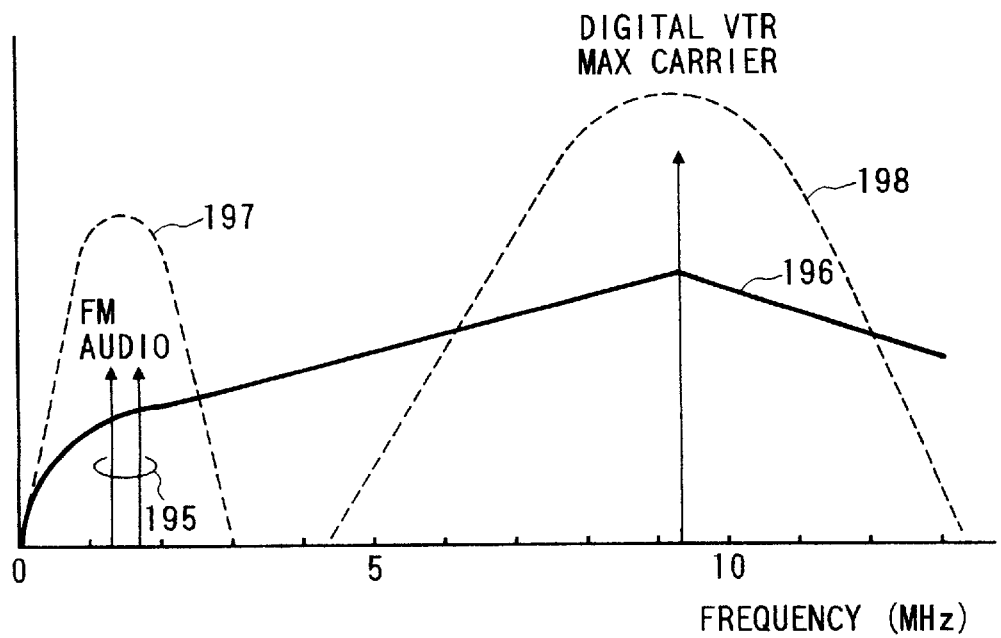
FIG. 18 is a diagram showing the output spectrum of an audio head.
Figure 23:
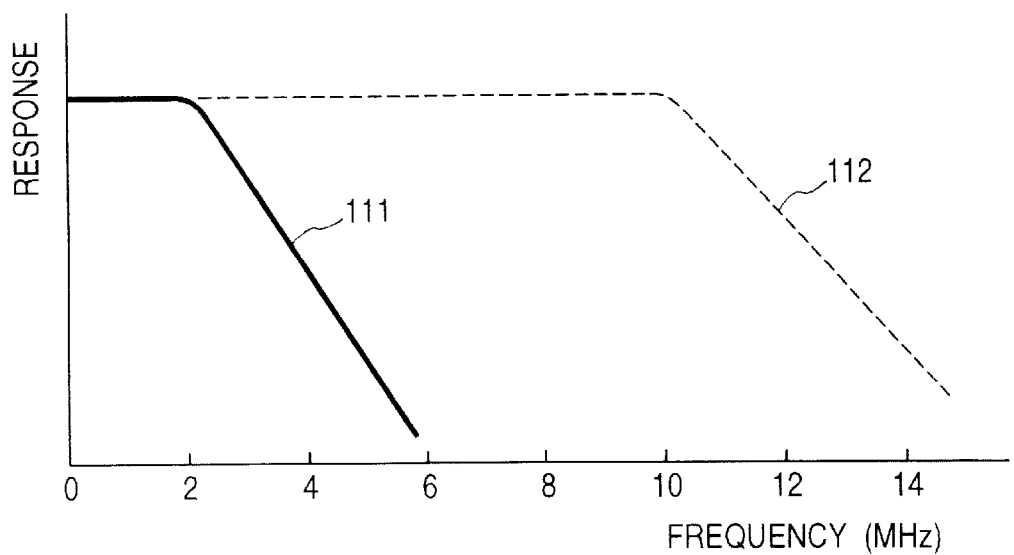
FIG. 23 is a graph showing the frequency characteristic of a reproducing head preamplifier for an FM audio head.

A mode identification control operation to be carried out in the reproducing mode by the VTR of FIG. 13 will be described hereinafter. The reproducing system of this VTR is the same as that of the VTR of FIG. 5. The configuration of the reproducing head preamplifier 50, which is one of the features of this VTR, will be explained. The VTR uses the high-fidelity audio heads of the current VHS VTR both as audio heads and a digital recording heads. As shown in FIG. 18, the bandwidth of FM audio signals is 1 to 2 MHz. In the digital recording mode, the frequency of a highest-frequency carrier signal of a digital signal of a transmission rate of 18.6 bps (bit per second) is 9.3 MHz. A conventional reproducing head amplifier for FM audio signal processing is an amplifier designed specially for dealing with audio signals and has a narrow pass band to enable signal reproduction in a high S/N ratio. Since this VTR uses the FM audio heads both as audio heads and digital reproducing heads, and hence the recording head preamplifier 50 is used for both purposes. The reproducing head preamplifier 50 has a wide pass band, as indicated by a curve 112 in FIG. 23, to reproduce digital signals, and the LPF 52 is connected to the input side of the FM audio signal processor 53 to transmit only audio signals in a limited frequency band as indicated by a curve 111 in FIG. 23, which is the feature of the system that uses audio heads both as audio heads and digital heads. Thus, the VTR is able to process the output signals of both the audio heads and the digital heads by only one reproducing head amplifier when the bandwidth of the reproducing head amplifier is large enough for reproducing digital signals and a low-pass filter that transmits FM audio signals is connected to the audio signal processor 53, which simplifies the configuration of the VTR.

Figure 17:
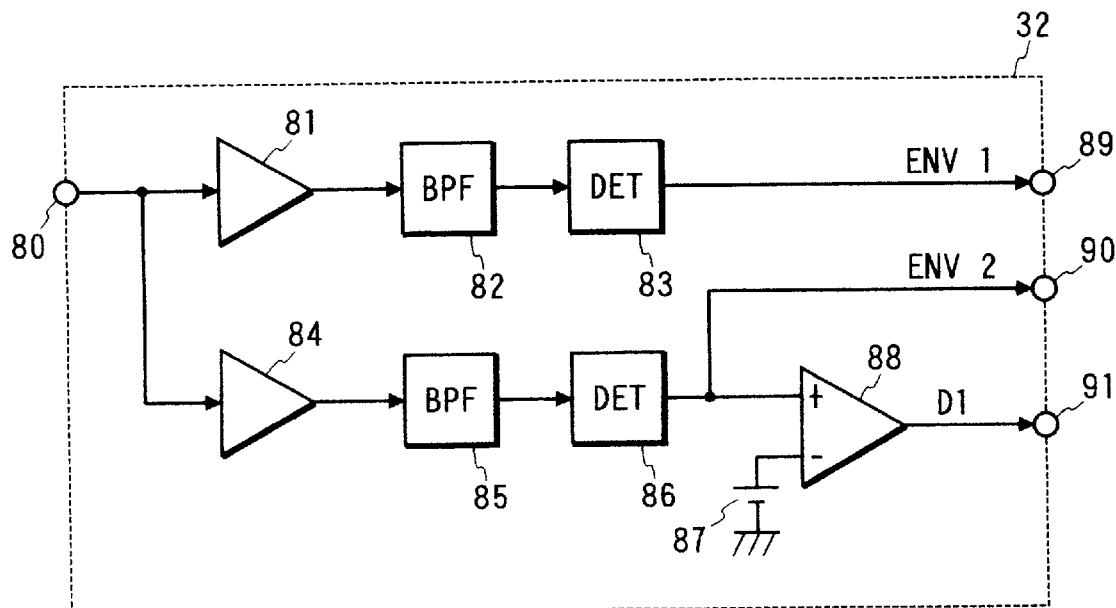
FIG. 17 is a block diagram of a frequency/envelope detecting circuit.

The output signals of the audio/digital heads 5a and 5b are amplified by the reproducing head amplifier 13 to a desired level, the amplified output signals are given to the frequency/envelope detector 32, and then the frequency/envelope detector 32 gives a digital signal detection signal D1, an audio signal band detection signal ENV1 and a digital carrier signal detection signal ENV2 to the servo system controller 25. FIG. 17 shows the configuration of the frequency/envelope detector 32. When the reproduced signal is applied to a terminal 80, amplifiers 81 and 84 adjust the respective signal levels of the FM audio signal and the digital signal so that those signal levels are substantially equal to each other. A BPF 82 extracts the audio signal, and then a detector 83 detects the envelope of the audio signal and gives its output signal to a terminal 89. A BPF 85 extracts the digital signal, and then a detector 86 detects the envelope of the digital signal and gives its output signal to a terminal 90. The respective bandwidth characteristics of the BFPs 82 and 85 are indicated by curves 197 and 198 in FIG. 18. A comparator 88 compares the output signal of the envelope detector 86 and a threshold to detect the digital signal and gives its output signal to a terminal 91. A dc power supply 87 determines the threshold of the comparator 88.

Figure 21:
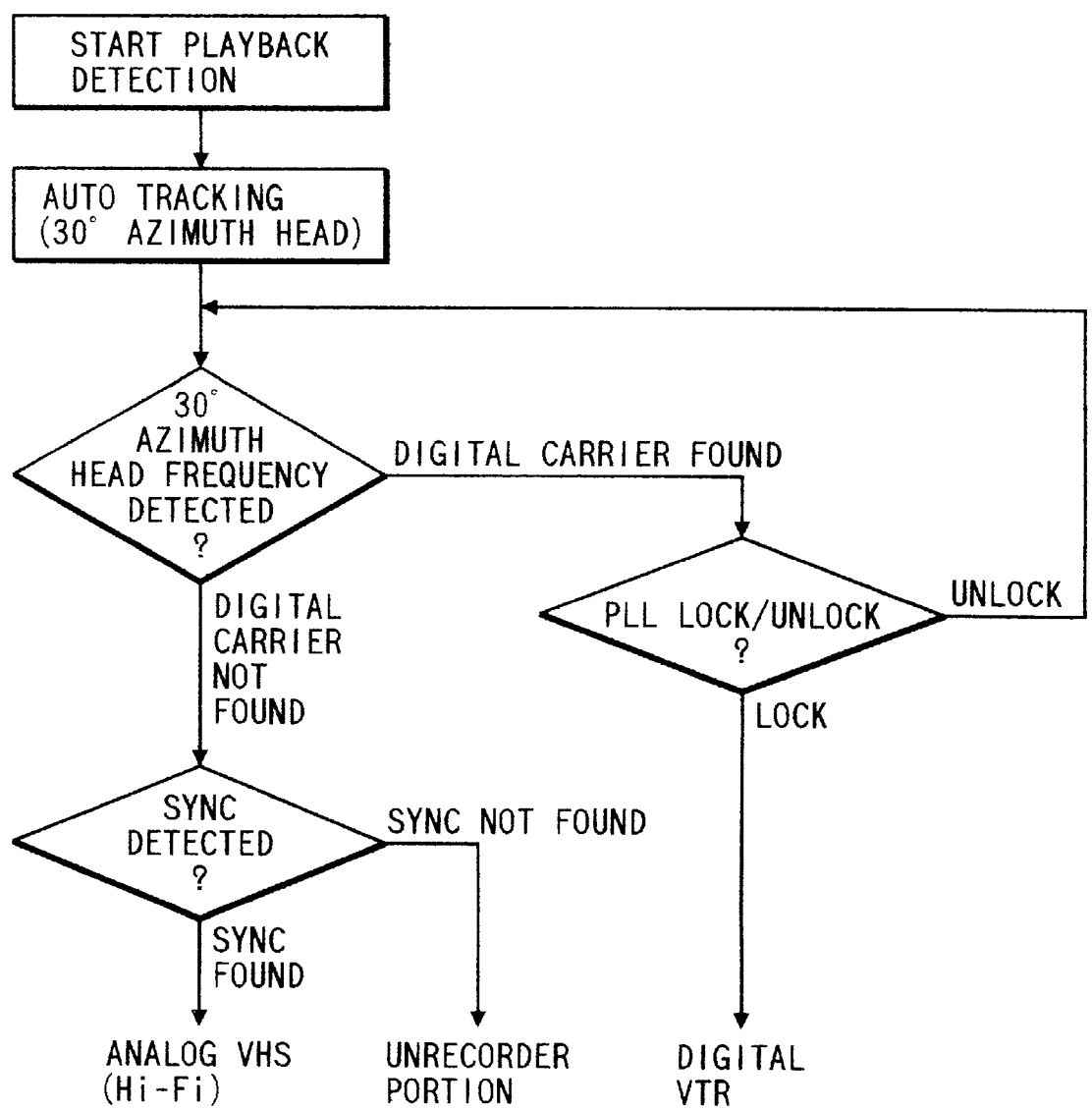
FIG. 21 is a flowchart of an analog/digital identifying program for a reproducing mode.
Figure 22:
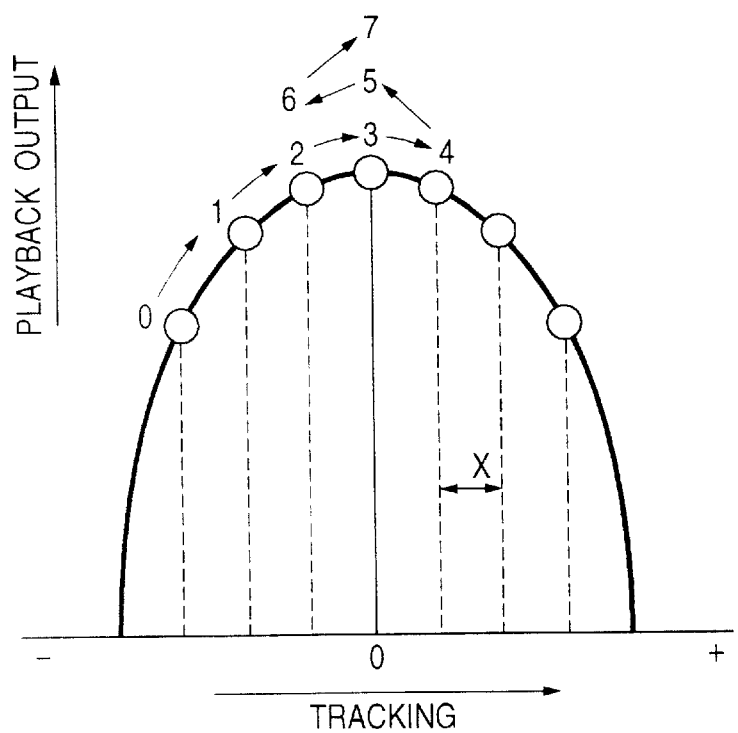
FIG. 22 is a diagram for explaining an automatic tracking operation of a VTR.

FIG. 21 is a flowchart of another mode identification control operation to be carried out in the reproducing mode. Signals are reproduced from the tape by the heads of the same azimuth before frequency detection, and the servo system controller 25 must execute automatic tracking control on the basis of either the output signal ENV1 of the detector 83 or the output signal ENV2 of the detector 86 so that the envelope detection output increases to a maximum. A hill climbing control method illustrated in FIG. 22 is an example of the automatic tracking control method. Tracking is shifted at steps of ΔX so that the reproduced output changes from a value at a point 0→1→2→3→4→5→6 to a maximum at a point 7 (points 3, 5 and 7). After completing the tracking control, the frequency of the output signal of the reproducing head preamplifier 13 is detected. If there is a digital signal, the mode may be considered to be probably a digital mode. However, the mode is decided definitely to be a digital mode when the phase is locked by the PLL 18. If the phase is not locked, the result of frequency detection is reviewed. If there is not any digital signal, the synchronizing signal detector 29 examines the demodulated output signal of the video signal processor 28 to detect a horizontal synchronizing signal and provides a detection signal D3. It is decided that the mode is the analog VHS mode if a horizontal synchronizing signal is detected or that no signal is recorded if no horizontal synchronizing signal is detected. When no signal is recorded, the OSD circuit 30 sets a blue back state in which a solid blue background is displayed on the screen of the TV set.

The switching operation for switching the component circuits according to the aforesaid result will be described. Referring to FIG. 5, the switching circuit 100 selects a linear audio signal or an FM audio signal and gives the linear audio signal or the FM audio signal to the mute circuit 16 or 20. In the analog mode, a mute signal D2 is LOW and a mute signal D2' is HIGH to disable the mute function of the mute circuit 16 and to enable the mute function of the mute circuit 20. In the digital mode, the mute signal D2 is HIGH and the mute signal D2' is LOW to enable the mute function of the mute circuit 16 and to disable the mute function of the mute circuit 20. Both the mute signals D2 and D2' remain HIGH until mode identification is completed and the servo system controller 25 controls the mute circuits 16 and 20 so as to mute the audio signal and the digital signal to prevent the generation of noise and disturbance of pictures during mode identification.

Figure 24:
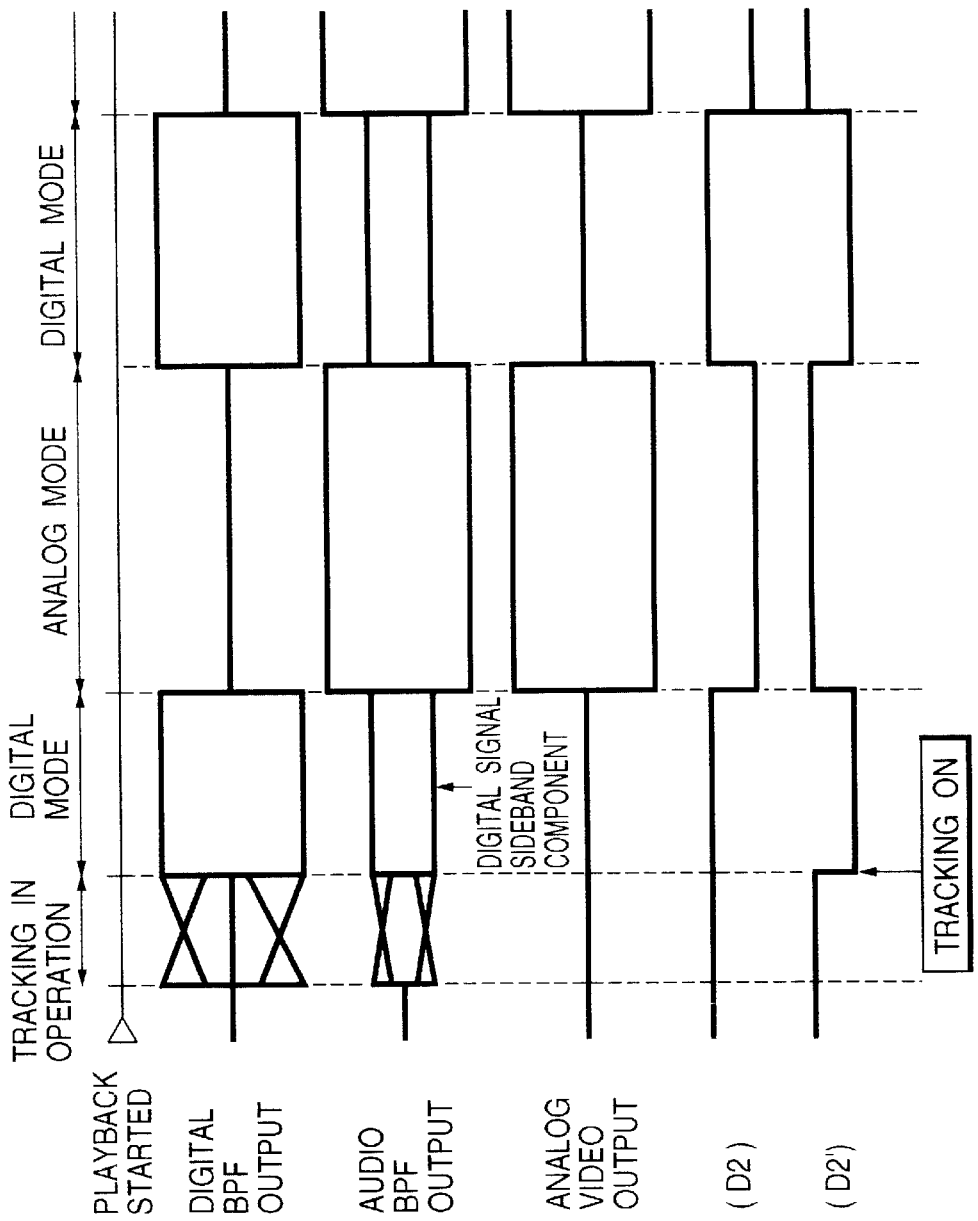
FIG. 24 is a waveform chart of assistance in explaining the operations of functional units in a reproducing mode.

FIG. 24 shows the waveform of signals during mode identification. After the reproducing operation has been started and the tape loading operation of the mechanisms has been completed, the tracking operation is started according to the level of the output signal of the audio head. In this state, an adjacent crosstalk component is produced as shown in FIG. 24. The mute signals D2 and D2' are held HIGH until the tracking operation is started, and then the mute signal D2 remains HIGH and the mute signal D2' goes LOW after the tracking operation has been started.

The previously-mentioned automatic tracking control operation will be explained. For example, in a conventional analog VHS VTR, the servo system controller 25 controls the capstan motor 11 by sending a control signal CCNT to the motor driver 24 so that the output ENV3 of the envelope detector 27 for detecting the envelope of the audio signal is increased to a maximum in the SP mode in which adjacent crosstalk disturbance does not occur. In the long play mode, for example, the EP mode in which adjacent crosstalk disturbance occurs, the automatic tracking control operation uses information provided by the FM audio head of an azimuth angle of 30° which is hard to be subject to adjacent crosstalk disturbance. In the analog/digital compatible VTR of the present invention, the servo system controller 25 selects either the envelope detection signals ENV1 and ENV3, or an envelope detection signal ENV2 according to the mode identification signal D2 to use the envelope detection signals ENV1 and ENV3 in the analog mode, and to use the envelope detection signal ENV2 in the digital mode for the automatic tracking control operation. From a different angle of view, reproducing mode identifying methods are classified by tape speed as shown in Table 1.

TABLE 1

| Tape Speed | Analog mode | Digital Mode | Identifying Method |
|---|---|---|---|
| 1 | SP | HD | Frequency/PLL |
| ½ | LP | ED | Frequency/PLL |
| ⅓ | EP | — | CTL |
| ¼ | — | SD | CTL |
| 1/12 | — | LD | CTL |

The VHS VTR has an SP mode (tape speed: 1), an LP mode (tape speed: ½), and an EP mode (tape speed: ⅓). In the digital VHS VTR, when a tape carrying signals recorded in the digital recording mode are subjected to reproduction in the analog mode, there is a possibility for the audio signal processor to process digital signals for audio processing when portions carrying digital signals of the tape are subjected to reproduction. In such a case, the loudspeaker generates abnormal sounds if the reproduced signals are given to the loudspeaker and, in the worst case, the loudspeaker might be destroyed. The generation of abnormal sounds may be avoided, for example, by selecting the SD mode or the LD (Low Definition) mode, in which tape speed is ¼ or 1/12 of tape speed in the SP mode, as shown in Table 1, and by not locking serve for a digital tape carrying digital-recorded signals in the analog mode. When such a tape speed different from the tape speed for the SP mode is selected, the reproducing mode can be identified by the frequency or period ratio between the CTL signal recorded in the lower edge portion of the tape as reproduced by the CTL head 9 and the FG signal provided by the capstan motor 11 (CFG signal). The digital VTR is able to set a high-quality picture mode, and the tape speed needs to be increased because the digital VTR needs to deal with an increased information content for a high-quality picture mode, such as the HD mode or the ED (Extended Definition) mode. When the same tape speed as that for the SP mode or the LP mode is selected for the ED mode or the ED mode, the frequency detection and the detection of the phase-locked state of the PLL previously explained with reference to FIG. 21 are necessary. The present invention uses the CTL/CFG ratio for mode identification when the tape speed for the analog mode and that for the digital mode are different from each other, or uses the frequency detection and the identification of the phase-locked state of the PLL for mode identification when the tape speeds for the analog and the digital modes are equal to each other.

The analog/digital compatible VTR of the present invention is compatible with a VHS VTR, and by using the FM audio heads for recording/reproducing digital signals, it achieves analog/digital identification highly efficiently by detecting the frequency and the phase-locked state of the PLL by information provided by the FM audio heads. The generation of abnormal sounds and the disturbance of pictures due to an erroneous identification operation can be prevented by muting the reproduced audio and digital signals until the completion of the identification. The mode is identified by the ratio between the CTL signal and the CFG signal when the tape speeds for the analog mode and the digital mode are equal to each other, or through the detection of the frequency and the detection of the phase-locked state of the PLL when those tape speeds are different from each other. Thus, the various modes can be stably identified.

The automatic tracking function of the analog/digital compatible VTR can be practiced in the analog mode by automatic tracking control through the detection of the envelopes of the output signals of the video heads and the audio heads, and can be practiced in the digital mode by automatic tracking control through the detection of the envelopes of the outputs of the audio heads (digital heads) to display reproduced pictures stably.

Figure 14:
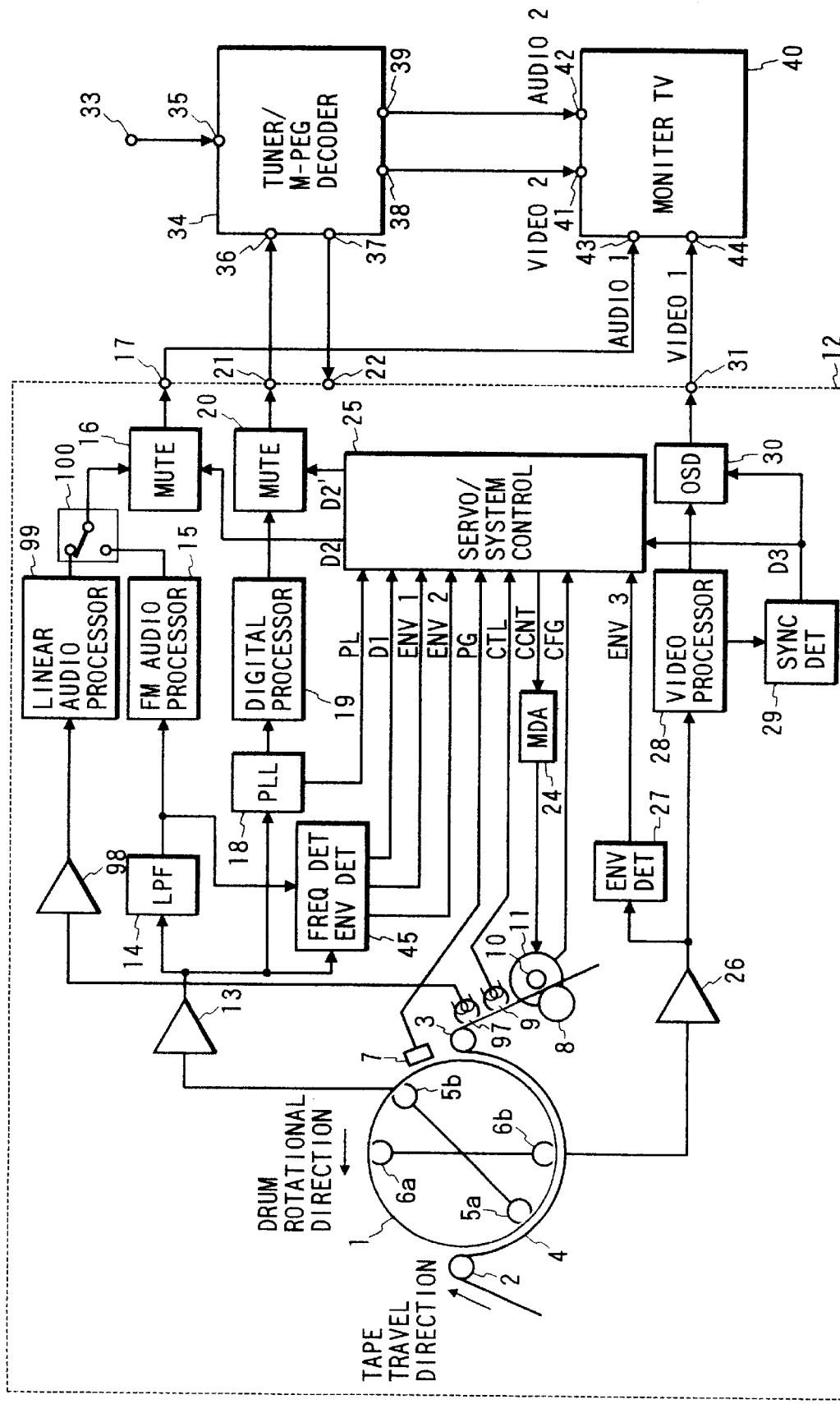
FIG. 14 is a block diagram of a reproducing system included in a VTR in accordance with the present invention.
Figure 19:
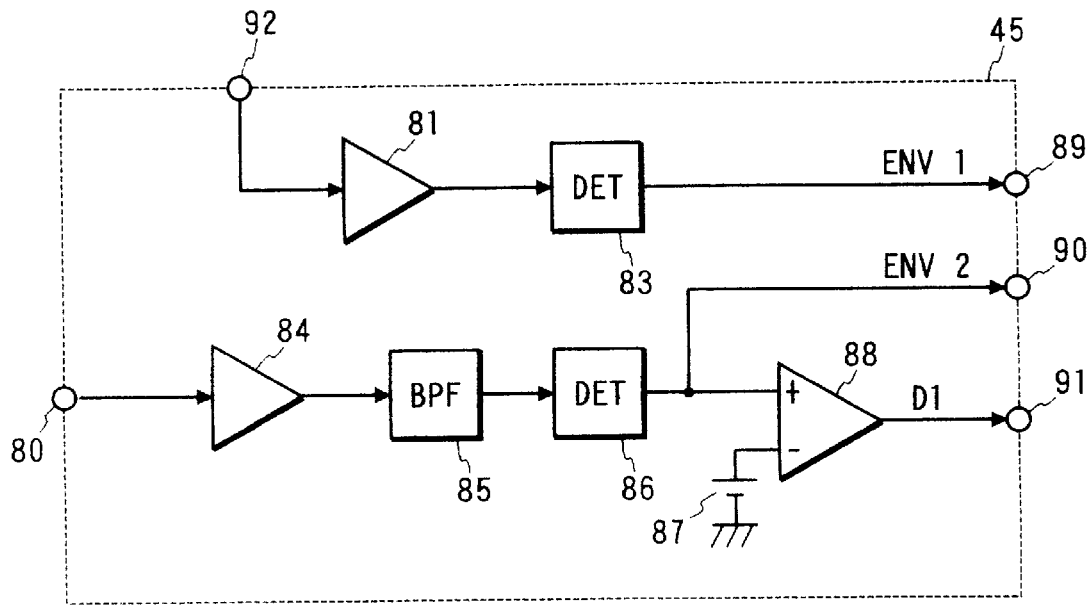
FIG. 19 is a block diagram of a frequency/envelope detecting circuit.

FIG. 14 shows a VTR representing a further embodiment according to the present invention. This VTR is the same in configuration as the VTR of FIG. 5, except that the VTR of FIG. 14 has a frequency/envelope detector 45 connected to the output side of the LPF 14 to receive audio signals from the LPF 14. FIG. 19 shows the configuration of the frequency/envelope detector 45. As compared with the frequency/envelope detector 32 shown in FIG. 17, this frequency/envelope detector 45 is provided with an additional audio signal input terminal 92 and is not provided with any component corresponding to the BPF 82 for transmitting only signals of frequencies in a limited frequency band. The band limiting function can be replaced by the output signal of the LPF 14 connected to the output side of the reproducing head amplifier 13.

Figure 15:
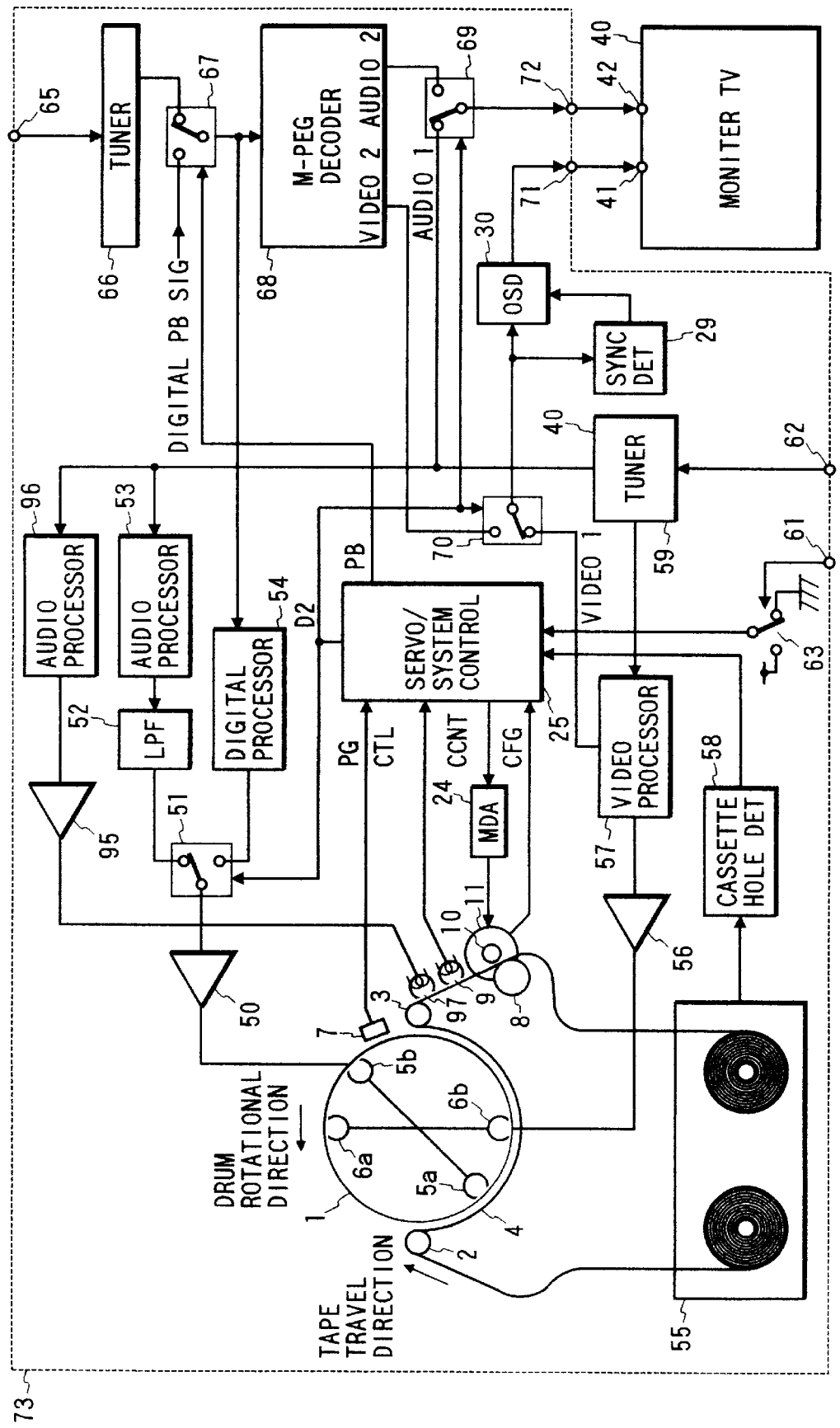
FIG. 15 is a block diagram of a recording system included in a VTR in a preferred embodiment according to the present invention.
Figure 16:
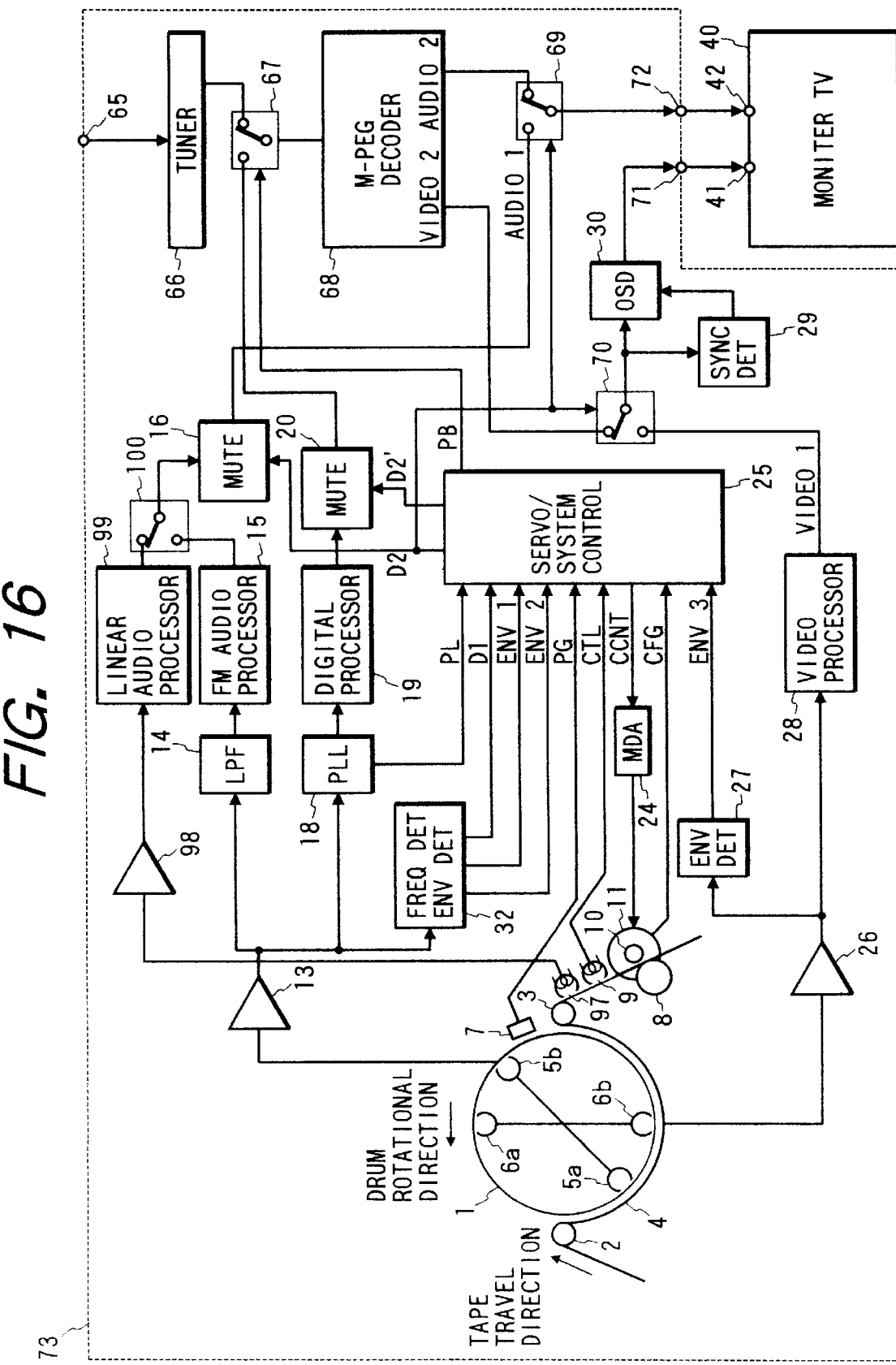
FIG. 16 is a block diagram of a reproducing system included in the VTR of FIG. 15.

FIGS. 15 and 16 are block diagrams of a recording system and a reproducing system, respectively, of a VTR in a further embodiment according to the present invention. The VTR is an analog/digital compatible VTR provided with a built-in MPEG decoder that receives bit-compressed digital signals and converts the same signals into composite video signals.

Referring to FIG. 15, a digital signal transmitted by satellite broadcasting or an optical cable and applied to an input terminal 65 is converted into a bit-compressed digital signal of the MPEG system by a tuner 66, and the bit-compressed digital signal is transferred through the recording/reproducing switching circuit 67 to the digital signal processor 54 and an MPEG decoder 68. The rest of the recording processes after the digital signal processor 54 are the same as those executed by the VTR of FIG. 13. A switching circuit 70 transfers selectively either a video output signal Video2 of the MPEG decoder 68 or a video output signal Video1 of an analog video signal processor 57 (usually, a monitor output controlled by AGC) to the OSD circuit 30. The output signal of the OSD circuit 30 is transferred through an output terminal 71 to the monitor TV 40. A switching circuit 69 transfers selectively either an audio output signal Audio2 of the MPEG decoder 68 or an audio output signal Audio1 of the tuner 59 through an output terminal 72 to the monitor TV 40.

The operation of the reproducing system of the VTR will be described hereinafter with reference to FIG. 16. A reproduced digital signal is transferred through a switching circuit 67 to the MPEG decoder 68. The switching circuit 69 transfers selectively either the audio output signal Audio2 of the MPEG decoder 68 or the analog reproduced signal Audio1, and the switching circuit 70 transfers selectively either the video output signal Video2 of the MPEG decoder 68 or the reproduced analog signal Video1. This VTR is characterized by the following features. First, a switching circuit 100 selects either a linear audio signal or an FM audio signal, and the switching circuit 69 performs an analog/digital switching operation for the audio signals to transfer a signal to the output terminal 72. Secondly, switching circuit 70 performs an analog/digital switching operation for the video signals to transfer a signal to the output terminal 71 through the OSD circuit 30. Thus, one OSD circuit may be sufficient, and stable signals are supplied to the monitor TV 40 in both the analog mode and the digital mode. Thirdly, the switching circuit 67 connected to the input side of the MPEG decoder 68 changes over from either digital signal recording or digital signal reproducing to the other.

The VTR with the built-in MPEG decoder changes over the audio output of the MPEG decoder after selecting either the linear audio output or the FM audio output, which simplifies the circuit configuration. Since the OSD circuit is connected to the switching circuit for selecting either the analog video output or the video output of the MPEG decoder (digital video output), the circuit configuration is simplified. The VTR is capable of stably sending signals to the monitor TV and of suppressing the disturbance of pictures.

What is claimed is:

1. A helical scanning tape recorder for recording video signals or audio signals on a magnetic tape contained in a tape cassette using a rotary head and for reproducing video signals or audio signals recorded on the magnetic tape using the rotary head, said tape recorder comprising:

a digital signal recording system for recording on the magnetic tape digital video signals by a first rotary head having a first azimuth angle or digital audio signals;

an analog signal recording system for recording analog video signals on the magnetic tape by a second rotary head having a second azimuth angle different from the first azimuth angle or analog audio signals on the magnetic tape by a third rotary head having an azimuth angle which is the same as the first azimuth angle;

a cassette identifier which identifies the type of tape cassette by the shape thereof when the same is loaded into the tape recorder;

a system selector which selects either said digital signal recording system or said analog signal recording system for recording video signals or audio signals; and a controller which inhibits a recording operation when the type of the tape cassette identified by the cassette identifier is incompatible with the digital signal recording system selected by the system selector.

2. A tape recorder according to claim 1, further comprising a warning unit that gives a warning to the operator when recording operation is inhibited by said controller.

3. A tape recorder according to claim 2, wherein said warning unit generates a warning sound.

4. A tape recorder according to claim 1, wherein said controlling performs a control operation to eject the tape cassette when the controller inhibits a recording operation.

5. A tape recorder according to claim 1, wherein said first rotary head and said third rotary head are the same rotary heads.

6. A helical scanning tape player for reproducing video signals or audio signals on a magnetic tape contained in a tape cassette using a rotary head, said tape player comprising:

a digital signal recording system for recording digital video signals or digital audio signals recorded on the magnetic tape at a first tape speed;

an analog signal recording system for reproducing analog video signals or analog audio signals recorded on the magnetic tape at a second tape speed which is different from the first tape speed;

a recording mode detector which detects a recording mode in accordance with a pitch of control signals recorded on the magnetic tape to indicate a tape speed in which the video signals or the audio signals are recorded on the magnetic tape;

a cassette identifier which determines whether or not the tape cassette is a digital recording tape cassette on the basis of the shape thereof when the same is loaded into the tape player; and a controller that starts the digital signal reproducing system for carrying out a digital reproducing operation when the tape cassette is identified to be a digital recording tape cassette by the cassette identifier, starts the analog signal reproducing system for carrying out an analog recording operation when the tape cassette is identified to be not a digital recording tape cassette by the cassette identifier, and changes over between signal reproducing systems according to the recording mode detected by the recording mode detector after a reproducing operation has been started.

7. A tape player according to claim 6, wherein said cassette identifier means determines whether or not the tape cassette is a digital recording tape cassette on the basis of a cassette identification hole formed in the tape cassette.

8. A tape player according to claim 6, wherein the recording mode detector detects the recording mode on the basis of the tape speed at which the magnetic tape was fed when recording the signals reproduced from the magnetic tape.

9. A tape player according to claim 6, wherein the recording mode detector determines the recording mode on the basis of whether or not the recorded signals are digital signals.

10. A helical scanning video tape recorder for recording video signals and audio signals on a magnetic tape contained in a tape cassette using a rotary head and for reproducing video signals and audio signals recorded on the magnetic tape using the rotary head, said video tape recorder comprising:
- a digital recording system for recording digital video signals and digital audio signals on the magnetic tare by a first rotary head having a first azimuth angle;
- an analog signal recording system for recording on the magnetic tape analog video signals by a second rotary head having a second azimuth angle which is different from the first angle or analog audio signals by a third rotary head having an azimuth angle which is the same as the first azimuth angle;
- a cassette identifier which identifies the type of tape cassette by the shape thereof when the same is loaded into the video tape recorder; and
- a controller which inhibits a recording operation by the analog recording system when the type of tape cassette identified by the cassette identifier is not a predetermined type.

11. A video tape recorder according to claim 10, wherein the cassette identifier determines whether or not the tape cassette loaded into the video tape recorder is a digital recording cassette on the basis of a cassette identification hole formed in the tape cassette.

12. A tape recorder according to claim 10, wherein said first rotary head and said third rotary head are the same rotary heads.

13. A helical scanning video tape recorder for recording video signals and audio signals on a magnetic tape contained in a tape cassette using a rotary head and for reproducing video signals and audio signals recorded on the magnetic tape using the rotary head, said video tape recorder comprising:
- an analog signal recording system for recording analog video signals and analog audio signals on the magnetic tape;
- an analog signal reproducing system for reproducing analog video signals and analog audio signals recorded on the magnetic tape;
- a recording mode detector which detects a recording mode in which the video signals and the audio signals are recorded on the magnetic tape on the basis of a pitch of control signals recorded on the magnetic tape; and
- a controller which inhibits a recording operation by the analog recording system when the recording mode detected by the recording mode detector is not substantially the recording mode of said analog signal recording system.

14. A video tape recorder according to claim 13, wherein the recording mode detector detects the recording mode on the basis of the tape speed at which the magnetic tape was fed when recording the signals reproduced from the magnetic tape.

15. A helical scanning video tape recorder for recording video signals and audio signals on a magnetic tape contained in a tape cassette using a rotary head and for reproducing video signals and audio signals on the magnetic tape using the rotary head, said video tape recorder comprising:
- a digital signal recording/reproducing system for recording digital signals on the magnetic tape by a first rotary head having a first azimuth angle and for reproducing digital signals recorded on the magnetic tape by said first rotary head;
- an analog signal recording/reproducing system for recording on the magnetic tape analog video signals by a second rotary head having a second azimuth angle which is different from the first azimuth angle and analog audio signals by a third rotary head having an azimuth angle which is the same as the first azimuth angle and for reproducing analog video signals and analog audio signals recorded on the magnetic tape by said second rotary head and said third rotary head, respectively;
- a cassette identifier which identifies the type of the tape cassette by the shape thereof when the same is loaded into the video tape recorder;
- a recording mode detector which detects a recording mode in which the video signals and the audio signals are recorded on the magnetic tape on the basis of a Ditch of control signals recorded on the magnetic tape;
- an operating mode decider which determines a recording mode or a reproducing mode according to information acquired from said cassette identifier or said recording mode detector; and
- a controller which carries out a control operation specified for an operation mode to control said digital and said analog signal recording/reproducing systems according to a predetermined program.

16. A video tape recorder according to claim 15, wherein said controller inhibits a recording operation when the type of tape cassette identified by said cassette identifier is not a predetermined type.

17. A video tape recorder according to claim 15, wherein said operating mode decider determines whether a signal recorded on the magnetic tape is an analog signal or a digital signal, and said controller selects either said analog or said digital signal recording/reproducing system to be used for a reproducing operation on the basis of a decision mode by said operating mode decider.

18. A tape recorder according to claim 15, wherein said first rotary head and said third rotary head are the same rotary heads.

19. A helical scanning tape player for reproducing video signals or audio signals on a magnetic tape contained in a tape cassette using a rotary head, said tape player comprising:
- a digital signal reproducing system for reproducing digital video signals or digital audio signals recorded on the magnetic tape at a first tape speed;
- an analog signal reproducing system for reproducing analog video signals or analog audio signals recorded on the magnetic tape at a second tape speed which is different from said first tape speed;
- a recording mode detector which detects a recording mode in accordance with a pitch of control signals recorded on the magnetic tape to indicate a tape speed at which the video signals or the audio signals are recorded on the magnetic tape; and
- a controller which changes over between said digital and analog signal reproducing systems according to the recording mode detected by the recording mode detector after a reproducing operation has been started.

20. A helical scanning tape player for reproducing video signals or audio signals on a magnetic tape contained in a tape cassette using a rotary head, said tape player comprising:

a digital signal reproducing system for reproducing digital video signals or digital audio signals recorded on the magnetic tape at a first tape speed;

an analog signal reproducing system for reproducing analog video signals or analog audio signals recorded on the magnetic tape at a second tape speed which is different from said first tape speed;

a recording mode detector which detects a recording mode in accordance with a pitch of control signals recorded on the magnetic tape to indicate a tape speed at which the video signals or the audio signals are recorded on the magnetic tape and information of whether a reproducing signal is detected by the digital signal reproducing system; and a controller which changes over between said digital and analog signal reproducing systems according to the recording mode detected by the recording mode detector after a reproducing operation has been started.

21. A helical scanning tape player for reproducing video signals or audio signals on a magnetic tape contained in a tape cassette using a rotary head, said tape player comprising:

a digital signal reproducing system for reproducing digital video signals or digital audio signals recorded on the magnetic tape at a first tape speed;

an analog signal reproducing system for reproducing analog video signals or analog audio signals recorded on the magnetic tape at a second tape speed that is different from said first tape speed;

a recording mode detector which detects a recording mode in accordance with a pitch of control signals recorded on the magnetic tape to indicate a tape speed at which the video signals or the audio signals are recorded on the magnetic tape; and a controller which starts a predetermined reproducing operation and changes over between said digital and analog signal reproducing systems according to the recording mode detected by the recording mode detector after the reproducing operation has been started.

* * * * *